United States Patent [19]
Harris et al.

[11] Patent Number: 5,865,417
[45] Date of Patent: Feb. 2, 1999

[54] INTEGRATED ELECTRICALLY OPERABLE NORMALLY CLOSED VALVE

[75] Inventors: James M. Harris, Saratoga; John S. Fitch; Bradford A. Cozad, both of Newark; Dean Allyn Hopkins, Jr., San Jose, all of Calif.

[73] Assignee: Redwood Microsystems, Inc., Menlo Park, Calif.

[21] Appl. No.: 720,099

[22] Filed: Sep. 27, 1996

[51] Int. Cl.$^6$ ................................................. F16K 27/00
[52] U.S. Cl. ................................................. 251/11; 338/23
[58] Field of Search ............................... 251/11, 129.06, 251/129.01, 61.1; 60/530; 338/23

[56] References Cited

U.S. PATENT DOCUMENTS

| | | | |
|---|---|---|---|
| 3,856,259 | 12/1974 | Doherty, Jr. ............................... | 251/11 |
| 4,821,997 | 4/1989 | Zdeblick . | |
| 4,943,032 | 7/1990 | Zdeblick ................................... | 251/11 |
| 5,029,805 | 7/1991 | Albarda et al. ................. | 251/129.06 X |
| 5,058,856 | 10/1991 | Gordon et al. .............................. | 251/11 |
| 5,323,999 | 6/1994 | Bonne et al. ............................... | 251/11 |

FOREIGN PATENT DOCUMENTS

| | | |
|---|---|---|
| 0 587 912 A | 3/1994 | European Pat. Off. . |
| 44 22 971 A | 1/1996 | Germany . |

OTHER PUBLICATIONS

Redwood MicroSystems brochure Introducting the Flow–istor™ Flow Regulator from Redwood MicroSystems, 1996.

*Primary Examiner*—Kevin Lee
*Attorney, Agent, or Firm*—Skjerven, Morrill, MacPherson, Franklin & Friel; Bernard Berman

[57] ABSTRACT

A genus of integrated valves having an integrated actuator with a thin, flexible membrane formed of silicon driven by pressure of a fluid trapped in a cavity formed by bonding a first and second die. The cavity has a resistor formed therein through which current is driven to cause the pressure to rise and the flexible membrane to flex. Movement of membrane is used to drive a valve element to a position where it unblocks a port to open the valve. This genus includes species such as ultra clean embodiments where a containment barrier keeps ultra clean processing gases confined to a wetted area having materials and bonding agents selected so as to be chemically compatible with the materials and conditions in the wetted area. Low leak species include a compliant material for a valve seat which is deformed by a ridge surrounding a port in the closed position. It is this port which is blocked and unblocked by movement of the valve element to close and open the valve.

13 Claims, 13 Drawing Sheets

COMPOSITE

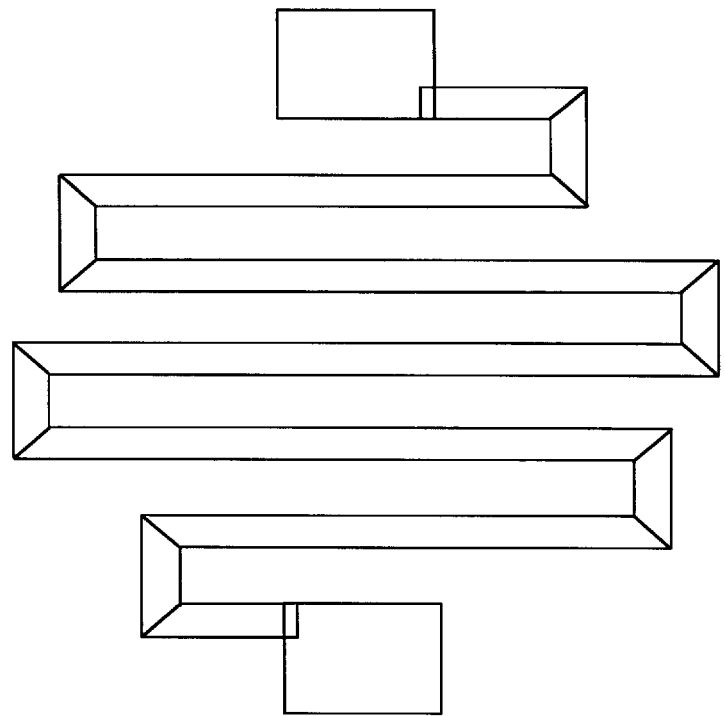
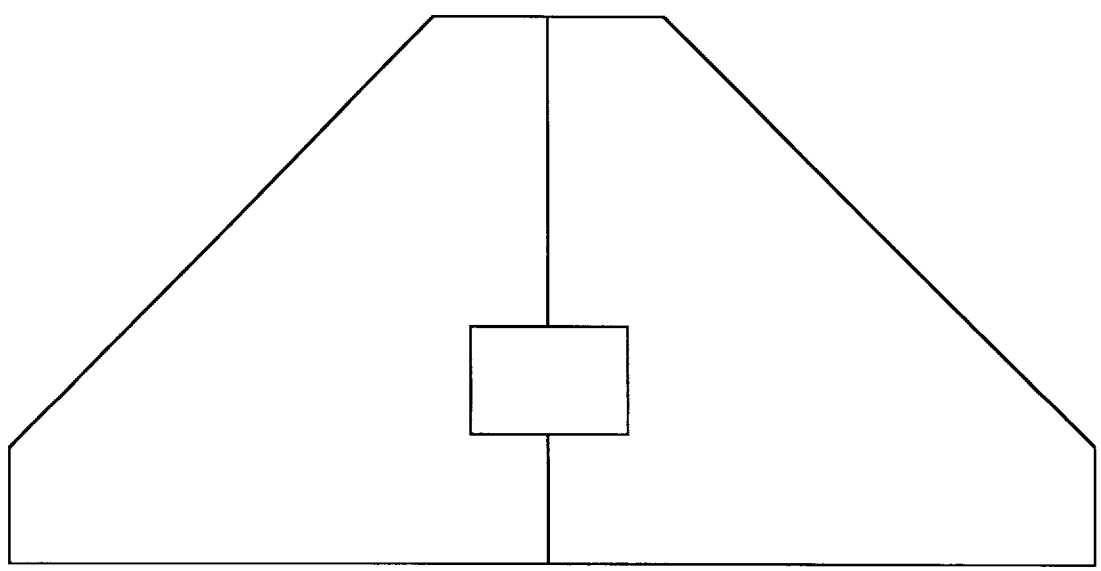
RES 1-A
FIG. 12

CAU 1-A

INTEGRATED ELECTRICALLY OPERABLE NORMALLY CLOSED VALVE

BACKGROUND OF THE INVENTION

The invention pertains to the field of micromachined integrated valves and, more particularly, to the field of low leak rate, normally closed valves for industrial and ultra clean applications. Semiconductor processing applications are examples of ultra clean applications.

Normally open, micromachined integrated valves are known in the prior art. Examples of various embodiments of such valves are given in U.S. Pat. Nos. 4,821,997 and 4,824,073 and 4,943,032 and 4,966,646 by Mark Zdeblick, assigned to Stanford University, the disclosures of which are hereby incorporated by reference. Such valves generally include a three die structure which uses the top two dies to form a sealed cavity having a fluid with a boiling point selected for the application to which the valve will be put, said fluid trapped therein and having one wall formed as a thin, flexible silicon membrane. A resistive element is also in the cavity on the top die and has electrical connections to the outside world by which current may be passed through the resistor. The bottom die has a valve seat formed therein and input and output flow channels which are coupled across the valve seat. When current is passed through the resistor, the trapped fluid is heated and expands thereby causing the flexible membrane to flex far enough to come into contact with the valve seat and cut off fluid flow from the input channel to the output channel.

Normally open valves are suitable for some applications, but in other applications normally closed valves are needed wherein the deenergized state (trapped fluid not heated) results in no flow from the input channel to the output channel. Normally closed valves can be micromachined on substrates having similar structures and using similar manufacturing techniques as the normally open integrated electric-to-fluidic valves. An example of such a normally closed valve is the Fluistor™ Microvalve (NC-105) manufactured by Redwood Microsystems, Inc. of Menlo Park, Calif. In this valve, the flexible membrane is coupled at one point by a pedestal to the bottom die in which the output channel is formed (the "bottom die" refers to the lowermost layer in which the input or output channel is formed, but the general term "die", as that term is used herein, both with reference to the prior art structures and the invention, refers to the separate layers of the structures shown in the figures regardless of the material of which they are made). The middle die in which the flexible membrane is formed also has formed into the silicon thereof a flat valve seat. Under this valve seat there is formed an output (or input) channel through the bottom die. When the valve is de-energized, the flat valve seat sits on top of the channel through the bottom die and cuts off flow therethrough. When the flexible membrane flexes as the trapped fluid is heated, the flexing movement is constrained at the position of the pedestal and is converted into a torque which causes the middle and top dies (the top die seals the fluid in the cavity) to pivot upward around the pedestal as pivot point. This raises the valve seat off the channel formed through the bottom die thereby opening the valve. The fluid flow is typically over the top of the upper two dies, through a separation between the second and third die and out a channel formed in the third die. The reverse flow pattern is less preferred, but acceptable.

The current Fluister™ (trademark of Redwood Microsystems, Inc.) valve works well for noncorrosive or nonflammable fluids to be controlled and where leak rates on the order of approximately $1 \times 10^{-4}$ cc-Atm/sec or more of Helium are good enough. However, in ultra clean processing and some industrial and medical applications, corrosive gases or fluids need to be controlled, and in some of these applications leak rates of less than $1 \times 10^{-6}$ cc-Atm/sec of Helium or better must be obtained. Further, in many applications, it is important that the integrated valve be constructed so as to not add any undesirable materials (contaminants) to the fluid stream being controlled. These contaminants may derive from or originate from the material of the valve or its attachment material. These contaminants would interfere with or degrade the semiconductor processing or add undesired material to the semiconductor devices being manufactured. Examples of such undesired materials include things such as metals, more specifically, alkali metals, or other substances such as organics. Further, because many of the fluids that must be handled in a manufacturing processing environment are corrosive and would eventually destroy most containment materials, very careful selection of materials in the wetted area of the fluid stream of an integrated silicon valve must be used to prevent contamination of the fluid stream and to minimize any corrosive effects.

A prior art integrated valve which is not chemically compatible with most processing environments is the NC105 manufactured by Redwood MicroSystems, Inc. of Menlo Park, Calif. This valve does not have a sealing ring around a chemically compatible wetted area to prevent fabrication fluids from reaching parts of the valve which are not "chemically compatible" as that term is defined herein and typically used.

Accordingly, a need has arisen for a normally closed integrated, microminiature valve which can control corrosive fluids for long periods of time without failing, and which, in some embodiments, has a low leak rate across the valve seat and to the outside world.

SUMMARY OF THE INVENTION

The teachings of the genus of the invention contemplate use of an integrated actuator with a thin membrane which flexes in response to energy inputs in the form of heating a trapped fluid in a sealed cavity of which the membrane forms one wall or in the form of pneumatic pressure coupled into the cavity. The movement of the membrane is mechanically coupled to a valve element that moves in response to the movement of the membrane thereby opening and closing the valve by blocking and unblocking a port. The port is coupled to input and output passageways serving as the input and output channels of the valve. In low leak species, a sealing surface which is more compliant than silicon is formed on the valve element which is moved by the membrane, or on the valve seat, so as to be deformed when the valve element comes into contact with the valve seat surrounding the port to form a tight seal. In some low leak embodiments, the valve seat can be comprised of a circular or rectangular ridge formed in silicon so as to have a relatively narrow top ridge such as 1–2 mils or larger in width which digs into an area of compliant material on the valve element when the valve is closed. In other species, the valve seat is a flat compliant sealing area surrounding an output port opening and the valve element has a round or rectangular ridge which surrounds the port and deforms the compliant material around the port when the valve is closed. In some low leak embodiments, a spring is used to push the valve element so as to apply more force causing greater deformation of the compliant sealing material on the lower valve seat. In some embodiments where a positive seal can be achieved without a spring, the spring is eliminated.

BRIEF DESCRIPTION OF THE DRAWINGS

FIGS. 12–16 are the individual mask drawings for the masks needed to build the embodiment of FIG. 1.

DETAILED DESCRIPTION OF THE PREFERRED EMBODIMENT

Some of the detail for processes to make various embodiments of integrated valve structures is known in the prior art exemplified by U.S. Pat. Nos. 4,821,997 and 4,824,073 and 4,943,032 and 4,966,646, all of which are hereby incorporated by reference herein.

Figure 1:
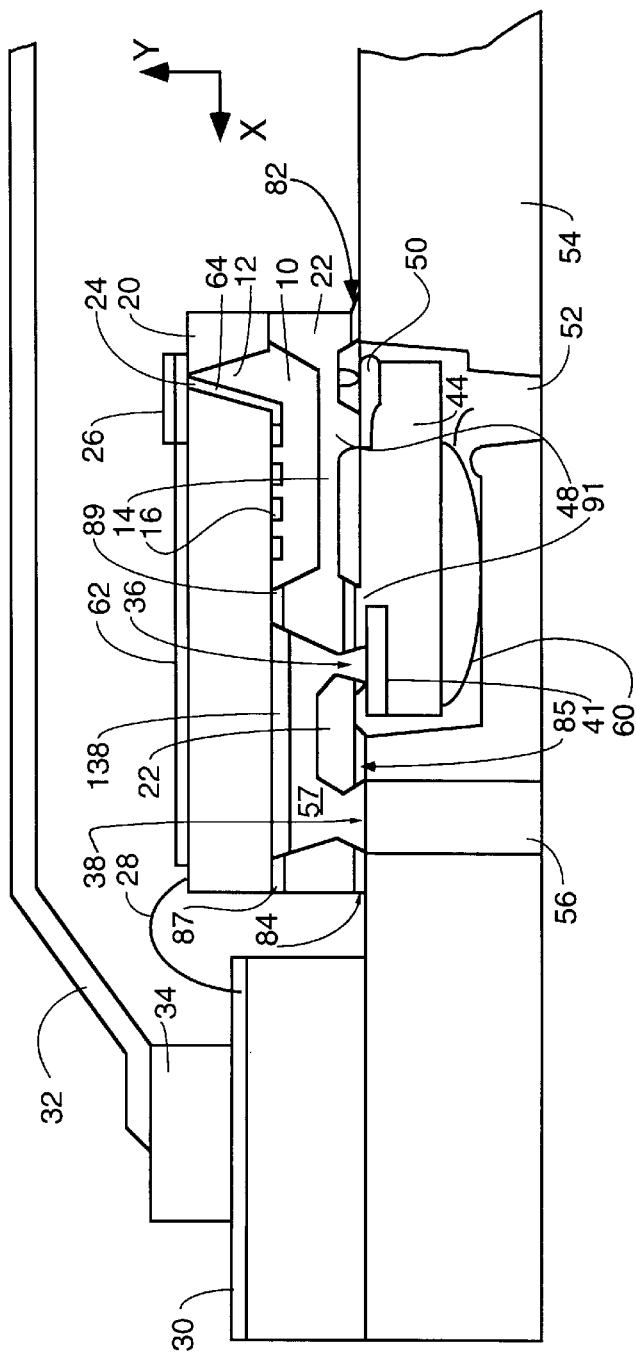
FIG. 1 shows a cross-section of one exemplary embodiment for a preferred embodiment of an integrated, normally closed, electrically operable, low leak valve with an element that moves in response to movement of a flexible membrane to open and close the valve.

Referring to FIG. 1, there is shown a cross-section of an exemplary embodiment for an integrated, normally closed, electrically operable valve with a low leak rate. The valve is generally comprised of a structure integrated into one or more dies so as to have a sealed cavity 10 which has one wall which acts as an impermeable membrane 14. The thickness and width of the membrane can therefore vary from one application to another depending upon the forces involved, but a typical thickness is 48 microns. Acceptable thicknesses for the flexible membrane range from 30 to 65 microns in <100> silicon are typical. The exact thickness is not critical so long as the membrane is flexible enough to move sufficiently to perform the task at hand, and strong enough to withstand the pressures involved in the use to which the valve is applied. The cavity has trapped therein a fluid material 12. This material may sometimes be referred to herein as a working fluid. The function of this material is to expand in the sealed cavity 10 when the material is heated so as to cause movement in the membrane 14 which is sufficient to move a valve member 44 enough to open the valve. The valve member 44 is normally in a position to block fluid flow through a port 36 which is in fluid communication between an input port 52 and an output port 56. When the membrane 14 moves, the valve member 44 rotates away from the port 36 thereby permitting fluid to flow from port 52 to port 56.

In the embodiment shown in FIG. 1, the valve can be made as a low leak valve by placing an area of compliant material 41 in the valve element 44. The compliant material is located so as to engage a ridge around the port 36 formed in the middle die 22 so that it is squeezed between the upper surface of the valve element 44 and the undersurface of the middle silicon die 22 all around the perimeter of the port 36 when the valve is closed. In an alternative embodiment, a compliant O-ring material could be formed in a groove in the upper surface of the valve element 44 so as to surround the port 36. In this embodiment, the port 36 could have a ridge around it that deformed the O-ring or the port could be surrounded by a flat surface such that the O-ring is deformed between the flat surface and the valve element when the valve is closed. The O-ring or compliant material 41 could be made of KALREZ™ or KEL-F™ compliant materials as well as other compliant materials that are chemically compatible with the application in which the valve is to be used. In some alternative embodiments, the O-ring may be pressed into a groove formed in either the top surface of the valve element or the bottom surface of the silicon die 22.

Figure 9:
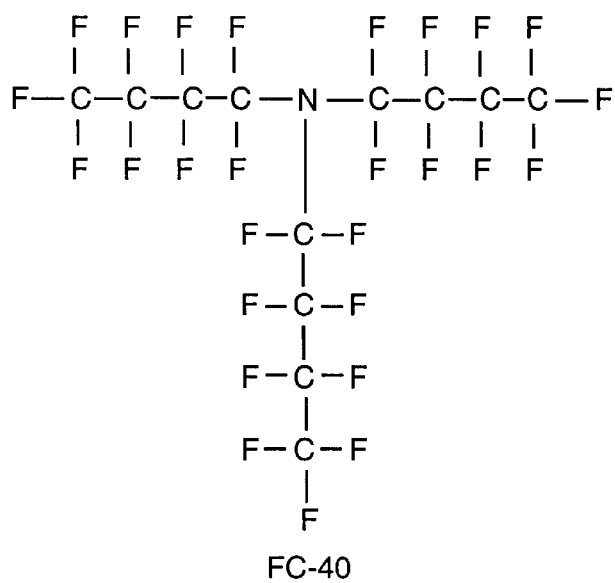
FIG. 9 is a diagram of the chemical formula of FC-40.
Figure 10:
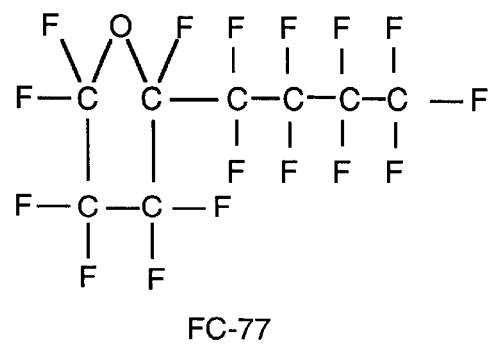
FIG. 10 is a diagram of the chemical formula of FC-77.

Generally speaking, the material 12 selected to fill the membrane chamber 10 is picked based upon its thermal expansion properties such that at the highest operating temperature likely to be experienced by the valve, the pressure of the fluid or gas in the chamber 10 will not be so great as to cause deflection of membrane 14 to move the valve member 44. Also, the fluid is preferably chemically inert so as to not cause adverse reactions with the material of the cavity and other materials with which it might come into contact, such as the resistor 16. In the preferred embodiment, the trapped material or working fluid 12 is a member of the fluorocarbon family, specifically those fluorocarbons marketed under the trademark Fluorinert™ and commercially available from 3M. Examples of these types of fluids are FC-40™, FC-43™, FC-72™, FC-77™ or FC-84™ or C.A.S. No. 86508-42-1. The particular Fluorinert chosen depends upon the operating conditions of the valve. The boiling point and thermal expansion coefficients of these Fluorinerts is a key factor in determining the optimum temperature range for operation, response time of the valve opening action and/or power consumption required. For example, FC-40 is a "blend of cut" which is predominantly perfluoro-tributylamine $[(C_4F_9)_3N]$ and has a molecular weight of 650 and the overall chemical formula $C_{12}F_{27}N$ and has a chemical structure as illustrated in FIG. 9. The chemical composition of alternative working fluid FC-84 is $C_7F_{16}$, and the chemical composition of another alternative working fluid FC-72 is $C_6F_{14}$. Another alternative working fluid, FC-77, is a blend of 50% $C_8F_{18}$ and 50% $C_8F_{16}O$, and has the chemical structure shown in FIG. 10. There are many working fluids that will work depending upon the application to which the valve is put. For example, alcohol, pure water, blends and combinations of fluids. In some embodiments, it is undesirable to form a gas bubble inside chamber 10 and in other embodiments, it is desirable, so choice of working fluid depends upon the application.

The preferred method of forming the sealed cavity 10 is by bonding a first Pyrex die 20 (preferably Pyrex #7740) to a second silicon die 22. The use of Pyrex #7740 is not critical to the invention so long as the material used has the capability of forming strong hermetic bonds with a silicon middle die. For example, the top die 20 may be silicon, and the middle die may be silicon, saphire or other materials capable of forming a thin, flexible membrane 14. The top die should have a thermal transfer properties compatible with the operating performance needed for power consumption. The currently used bonding process for bonding the Pyrex die 20 to the second silicon die 22 is by an anodic bond, the process for which is described below (see "Anodic Bond Process" heading) and in the technical literature of the prior art. To fabracate a valve suitable for an ultra clean environment or other environments of specific requirements, specific fabrication choices must be made such as choice of materials exposed in the wetted area that are chemically compatible with the desired processing environment, using low ionic epoxies or some other chemically compatible bond for the bond 50, coating the exposed pyrex in the wetted area with a barrier layer 138, and forming a chemically compatible containment sealing ring symbolized by the seals at 82, 84, 85, 87, 89 and 91 in FIG. 1.

Various bonding techniques to bond one substrate or die to another are known in the prior art, and those methodogies are hereby incorporated by reference. Examples of such prior art references are: Ko et al., "Bonding Techniques For Microsensors", from the book *Micromachining and Micropackaging of Transducers* edited by C. D. Fung et al. available from Elsevier Science Publishers B.V., Amsterdam (1985); From the SUSS Report—"Bonding with SUSS: A System Approach for MEMS" by Richter et al., Vol. 8, 3rd Qtr 1994; "Fabrication of Magnetic Microstructures by Using Thick Layer Resists" by Lochel et al., Vol. 6, 4th Qtr 1992; "Precision Wafer Bonding in a Controlled Environment: Critical System Design Issues" by Reyerse, Vol. 8, 4th Qtr 1994; "Silicon Accelerometer With New Thermal Self-Test Mechanism" by Pourahmadi et al., Vol. 7, 1st Qtr 1993; "Silicon-Silicon Direct Wafer Bonding" by Hughes et al., Vol 9, 3rd Qtr 1995; "Technical Challenges of Precision Wafer Bonding In Controlled Environments" by Reyerse et al., Vol. 9, 2d Qtr 1995. All of the foregoing references are hereby incorporated by reference.

The top Pyrex die 20 has formed thereon a metal resistor pattern 16 at a position such that the resistive pattern will be enclosed within the sealed cavity when the first die is bonded to the second die. The resistor 16 is preferably formed of a layer of titanium for example (25 Å to 100 Å thick) on the Pyrex for adhesion and a layer of platinum over the titanium (sufficient for a resistor value of 20 to 75 ohms). Other materials that can withstand the post resistor fabrication processes and temperatures may also be used. The top die 20 also has etched therethrough at least one, preferably two, fill holes.

The underside of the pyrex die 20 also has a chromium barrier layer 138 at the location of the intersection of a port 56 and an adjoining cavity 57 in a middle silicon die 22 and the Pyrex top die 20. This barrier is only necessary if the upper die 20 is Pyrex or some other material not compatible with the processing environment desired. The function of this chromium barrier 138 is to prevent the fluids in the wetted area from coming into contact with the Pyrex, or top die 20, and becoming contaminated with impurities in the Pyrex, and protecting the Pyrex material itself from possible corrosive attack by the fluid being controlled. Choices other than chromium for this barrier will be obvious to those skilled in the art. Eutectic or solder bonding could also be used between dies 20 and 22. In some embodiments, the top die 20 can be silicon and a fusion bond used between the top die 20 and the middle die 22. If a high temperature is used for this fusion bond, it must be performed before any low melting point material is present.

The fusion bonding process between a silicon top die 20 and a silicon middle die 22 is described in the technical literature. Materials with a high thermal conductivity may not be preferred for the top layer. This can effect the response time of the valve and cause power consumption to be greater. Resistor 16 must be insulated from the body of the top die 20 if it is conductive to prevent a short.

The second die 22 has a well or other depression etched therein which is deep enough relative to the thickness of the die to leave the thin wall which functions as membrane 14. This membrane is typically located 100 microns from the top of a 400 micron wafer. For the case of two fill holes, the second fill hole 24 is sealed after filling the cavity with a block of silicon or other material 26 which is compatible with the bonding process used to attach this block 26 over the fill hole so as to seal it.

Figure 2:
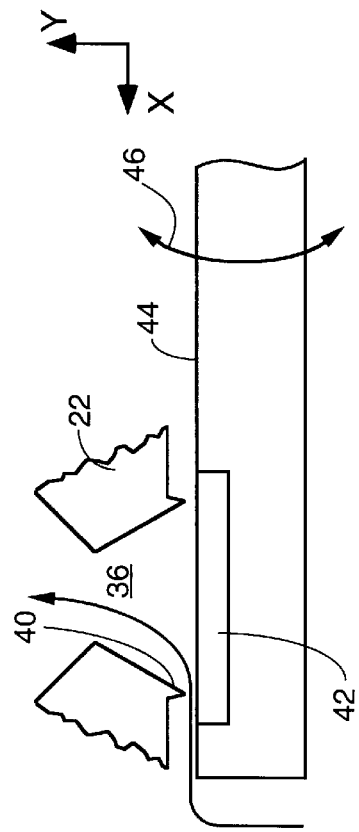
FIG. 2 is a closeup cross-sectional view of the preferred species of a low leak seal which can be used as the valve seat in many of the species within the genus of the invention and in the embodiment of FIG. 1 in particular.

The second die 22 has formed therein a fluid passageway having an input port 36 and an output port 38 coupled together by a fluid passageway. In low leak valves, the input port has a thin ridge around it which is preferably about 25–50 microns wide at its narrowest point. This ridge 40 is best seen in FIG. 2, and functions, in low leak valves, to depress a softer valve seat material 41 which is attached to a movable valve member 44 when the valve is closed thereby forming a tight seal. One preferred material for the valve seat material 41 is KEL-F™ which is commercially available from 3M. The chemical structure of this material is similar to Teflon™. Other possible candidates for the valve seat material 42 are Viton™, KALREZ™ available from DuPont and Teflon™, also available from DuPont. Also, in some embodiments, the compliant valve seat material 41 could be a metal which has adequate corrosion resistance and physical properties, including sufficient deformability in its elastic region. Nickel is an example of such a metal.

Criteria for selecting the compliant material for the valve seat 42 in low leak valves (the compliant valve seat 42 can be eliminated in normally closed valves which do not have to be "low leak", which for purposes of this application means leakage rates past the closed valve of $10^{-6}$ cc-atm/sec of helium or lower) include the following. (1) Permeability: the permeability of the compliant valve seat material must be low enough that material in the stream of fluid or gas being controlled cannot diffuse through the material sufficiently to exceed the low leak limit specification. (2) "Chemical compatibility": chemical compatibility as that term is used herein and in the claims means that for the useful life of the valve, the materials and bonding agents exposed to the fluids and process conditions in the "wetted area" must not physically degrade, corrode, swell, oxidize, decay, harden, sublimate, disappear or otherwise adversely change their physical properties or pollute the fluids being controlled with impurities which can adversely affect the structures being built. Other valve seat materials can be found in the literature. Specifically, the material selected for the compliant material and other materials in the wetted area must not, for the useful life of the valve (which varies from one application to another) decay, harden, or breakdown in the presence of the material being controlled or in the normal operating environment, and should not outgas or otherwise contribute undesirable impurities such as metals and some ions to the stream of fluid being controlled. In "ultra clean" and other embodiments intended for use in processing applications of extremely well controlled environments, the compliant material as well as all the other valve structural materials and any bonding agents with which the stream being controlled may come into contact for the given valve topography (all such structural materials and bonding agents in contact with the fluids being controlled being defined as the "wetted area") must be chemically compatible as defined above with the conditions and agents to which the wetted area is exposed in the well controlled fabrication process. Examples of undesirable impurities that should not be injected or otherwise enter into the stream being controlled are sodium ions, other alkali metals, gold or other metals (typically from bonds) and any other impurity that will degrade electrical or other characteristics of the devices or other products being acted upon by the process of which the valve is a part. In addition, all structural materials and bonding agents in the wetted area should be capable of withstanding the temperatures encountered in the process of fabricating the valve or in service. As an example of how to make choices for materials which are chemically compatible with certain materials or fluids being controlled, the reader should refer to publicly available guides to compatibility of various materials with various chemicals used in ultra clean processing. One such guide is published as the "COMPATIBILITY CHART" by Altair Gases and Equipment, Inc. of 1171 Ocean Ave., Oakland, Calif. 94608, Tel 800 680-2066. This is one guideline for selecting materials compatible with various fluids. This guide is not meant to be used in isolation. Care must be exercised and specific combinations tested under the user's conditions. (3) Durometer rating: the pliability or compliance of the material for the valve seat in low leak embodiments is preferably up in the 90 range with durometer ratings of 70 and lower being presently considered to be too soft, but, generally, having sufficient compliance to eliminate leaks caused by entrapped particulates from the controlled stream, nonparallelism between the valve member valve seat plane and the port being blocked or surface roughness of the compliant material and the material of the port being blocked. (4) Memory: the material selected for the compliant material of the valve seat must have sufficiently low memory or "set" so as to allow complete closure of the valve given the amount of movement of the valve member (typical travel of the membrane 14 is 2–4 mils). (5) Surface smoothness: the compliant valve seat material must have either sufficient surface smoothness or the ability to be polished to a smooth enough state to be able to achieve low leak performance in the expected environment of operation given the compliance of the material of the valve seat. (6) Purity: the compliant valve seat material should not contribute undesirable impurities into the stream of material being controlled. (7) Melting point: the compliant valve seat material should have a melting point sufficiently high to withstand temperatures experienced during either manufacture or operation of the valve. (8) Ease of formability: the material selected for the compliant valve seat material must be capable of being extruded, machined, molded or otherwised formed into a valve seat and bonded to the valve member.

Movements of the membrane 14 cause forces to be imparted to the valve member 44 because of the off center position of the pedestal 48. When the membrane flexes, the portion of the membrane upon which the pedestal 48 sits assumes an angle to the x-axis thereby causing movement of valve member 44 along arc 46 in FIG. 2 in the direction along the y-axis moving toward negative y values to open the valve. Since the valve is normally closed, heating the fluid causes the valve member 44 to swing away from the ridge 40 and opens the valve so that fluid entering passageway 52 in base 54 (typically $Al_2O_3$, alumina, a common ceramic) can pass between the valve seat 42 and the ridge 40 into inlet port 36 and then back out outlet port 38 in the second die and outlet port 56 in the base 54.

Note that the compliant valve seat can be eliminated in embodiments where low leakage is not required.

FIG. 2 is a blowup of the preferred embodiment for the compliant valve seat of FIG. 1 surrounding input port 36 in the second die 22 for low leak valves showing a soft valve seat material inset into the surface of a valve member 44 which is rotated into contact with the ridge 40 when the valve is closed. Valve member 44 arcs along path 46 to open and close the valve. This movement is caused by movements of the membrane 14 under the influence of heating and cooling of the trapped material 12. The valve member 44 is affixed to the second die 22 at a pedestal 48 by a bonding 50. The bonding at 50 can be epoxy or some other suitably strong joining material compatible with the environments of use. A preferred epoxy for the bond 50 in nonultra clean embodiments is Ablebond 400-5 commercially available from Ablestik Labs in Los Angeles.

When the valve is to be used in ultra clean environments, a low ionic bonding agent or a bonding process which is chemically compatible with the ultra clean processing environment may be preferred for bond 50. An example of a low ionic epoxy which may be suitable for bonds in ultra clean embodiments is QMI 505 Snap Cure Adhesive available commercially from Quantum Materials in Tucson, Ariz.

Other sealing methods will be obvious to those skilled in the art.

Although the pedestal 48 is taught in the embodiment as being bonded to the valve element 44, in other species within the genus of the invention, there is no physical attachment of the membrane 14 or any pedestal formed on the membrane to the valve element. Instead, in some of these species, the pedestal and membrane simply push either on the valve element itself or some intermediary element. The only functional requirement is that there be some means of transferring force from the actuator to the valve element to move it to the open position. Movement to the closed position can be under the influence of a spring, by virtue of a bistable valve element being pulled back to the closed position by a contracting membrane 14 caused by cooling the working fluid or by the effect of preloading forces acting on the valve element which are inherent effects of the particular valve element mounting structure.

The phrase "fluid guiding structure" in the claims is intended to mean any structure or combination of structures which contains the input and output ports and a fluid communication channel therebetween and which defines an intermediary port which is opened and closed by the movement of the valve element. In the embodiment of FIG. 1, the fluid guiding structure is the combination of channels and ports etched in die 22 and base 54 when the two structures are joined together in the proper alignment. The valve element 44 opens and closes port 36 at the interface between die 22 and base 54 to establish fluid communication between input port 52 and output port 56 in the open position and cut off this fluid communication in the closed position.

Many low leak embodiments also include a spring 60 to apply additional biasing force to push the valve member 44 into tight contact with the port being blocked to cause positive sealing. Generally, a force less than 50 grams is sufficient to close the valve. Valves of the current size specifications can exert about 50 grams of force, maximum. The spring should supply sufficient force to achieve the desired leak rate of $1\times10^{-6}$ cc/atm/He or better, preferably $1\times10^{-9}$ cc/atm/He for semiconductor processing applications. The preferred amount of force is currently thought to be approximately 20 grams of force but the amount of force supplied by the spring will vary from one application to another depending upon the desired leak rate, the desired valve opening time, the amount of force that can be supplied by the membrane, and the physical characteristics of the seat material.

In some embodiments, the closing biasing force is supplied by preloading the valve element 44 so as to push against the port being blocked when no force is being applied to the valve element 44 in a closed state. In some embodiments, the biasing force is applied solely through the low force being applied by the actuator and the pressure differential between the pressure in the input port 52 and the lower pressure in the output port 56. In some embodiments, the biasing force tending to cause a positive seal of the valve in the closed state is supplied solely by thermal contraction of the fluid within a completely filled cavity 10 tending to pull the membrane 14 in a direction to pull the valve element 44 into positive sealing engagement with the port 36 being blocked. These embodiments require a positive bond between the pedestal 48 and the valve element 44 so simple "push rod" type mechanical linkage embodiments between the pedestal or membrane and the valve element 44 do not use this type biasing means but rely on springs or preloading of the valve element 44 itself or upon a bistable configuration for the valve element 44. One form of preloading is to assemble the actuator and valve element 44 with a positive bond therebetween and with the actuator in a heated state such that the membrane is deflected at least a portion of full deflection, i.e., assemble the valve in a partially open state. Then, when the final valve assembly is cooled, the valve element 44 is pulled against the port being blocked by the contraction of the trapped working fluid and surface tension inside the cavity. The term "biasing means" in the claims is intended to cover all these variations. The maximum operating temperature for effective shut-off of the valve will be set by the temperature of this heated state.

The material of the valve element 44 can be silicon, stainless steel or any other material which meets the process requirements. In ultra clean valve embodiments, the material of the valve element 44 is preferably silicon, inconel, stainless steel or other materials that are chemically compatible, as that term has been defined above, with the fluids being controlled and which does not add impurities to the stream that are considered undesirable in ultra clean processing.

The phrase "integrated" in the claims is intended to mean a structure which has been formed in pyrex, silicon, stainless steel or alumina (ceramic) dies using integrated circuit manufacturing techniques, micromachining techniques or techniques for molding or otherwise machining or forming ceramics to form a structure comprised of multiple layers, some of which are bonded to or adhere to others. The term "actuator" as that term is used in the claims is intended to mean, more precisely, any "integrated" structure which can supply force by movement of a flexible membrane in response to energy inputs such as electrical current passing through resistor 16, laser beam energy shined on the trapped material 12, sometimes also referred to herein as the working fluid, or other means obvious to those skilled in the art. One embodiment for an actuator is included within the following definition for "structure integrated into one or more dies". Other embodiments for such an actuator are described in the Stanford patents incorporated herein by reference and in subsequent prior art developments in the art of integrated valves by Redwood Microsystems and others.

The phrase "structure integrated into one or more dies" in the claims is intended to include as one embodiment, the structure comprised of the first and second dies 20 and 22 bonded together to form sealed cavity 10 with membrane 14 and the trapped material 12, as well as the resistor 16 or other means to heat the trapped material and the fill hole 24 and the block 26 which seals the fill hole. The phrase "structure integrated into one or more dies" is also intended to cover any other integrated structure which includes a sealed cavity with a thin wall, trapped material and a means for heating the trapped material sufficiently to bend the thin wall sufficiently to be used in opening or closing a valve.

The conductors of the resistive element may be brought out to bonding pads on the outside edges of the top die. Typically this is done by forming a metallization layer 62 shaped as two electrically isolated conductors across the top of first die 20 which make contact with a metallization layer 64 formed on the inside of each of two fill holes (only one fill hole is shown for simplicity) under the sealing cap 26. These metallization patterns make contact with opposite ends of a resistive metallization resistor pattern 16 which extends across a surface of the cavity 10. On the top of the valve, a pair of lead wires (only a single wire bond 28 is shown) connects the two conductors of the metallization pattern 62 to two separate metal feedthrough patterns represented by feedthrough 30. The feedthroughs lead to the outside world through the hermetic seal provided by block 34 and cover 32. In the preferred embodiment, a metal cover 32 is soldered to a insulating sealing ring 34 which is typically ceramic and is hermetically sealed to and around the metal feedthrough 30 so as to form, in conjunction to the soldered joint between the cover 32 and sealing ring 34, a hermetic seal around the valve. This seal may not need to be hermetic in some applications.

"Valve element" or "valve member" as those phrases may be used in the claims means simply some structure which moves in response to movement caused by some portion of the actuator to cause opening and closing of the valve, typically by blocking or unblocking a port. The only functional requirement is that the valve element move in response to some movement of the actuator or something which is mechanically linked in such a way that it moves when some portion of the actuator moves. Further, the valve element must be rigid enough to form a seal with the valve seat 40, and, preferably, should be able to accept a compliant material such as shown at 42 in FIG. 2 or at 120 in FIG. 4 if a low leak valve is to be fabricated. The valve element can be any material or any shape which is compatible with the topology of the valve and the process for fabrication of the valve and the intended environment in which the valve will be used. It must be chemically compatible as that phrase was defined above. The valve element may take the form of a rectangular lever of silicon, stainless steel, ceramic, pyrex, inconel etc. depending upon the environment and materials to which the valve element may be exposed and its movement may be smooth or it may be bistable so that it snaps between open and closed positions.

Having a valve element which moves in response to movement of the actuator is a characteristic of the genus of the invention which represents an improvement over the Fluistor™ prior art. It represents an improvement because it minimizes the wetted area and gives the designer several options for choosing the material used.

The advantage that the valves disclosed herein within the genus defined by an integrated actuator having a flexible membrane which moves a separate valve element in response to energy inputs to the actuator is that the actuator itself does not have to move as is the case with the Fluistor™ valve. This makes it possible to limit the wetted materials. With a moving actuator die, it is difficult to form a good containment barrier seal such as the seals at 82, 84, 85, 87, 89 and 91. With valves according to the broad genus of the invention exemplified by claim 1, the actuator die does not move, so ultra clean valves can be made simply by adding a containment barrier such as seals at 82, 84, 85, 87, 89 and 9 to prevent the wetted area from including any portions of the actuator with metallization patterns thereon or any junctions with other than low ionic bonding materials therein or any portions of the actuator or other portions of the valve structure which are made of materials which are not chemically compatible with the ultra clean processing environment or fluids.

Figure 4:
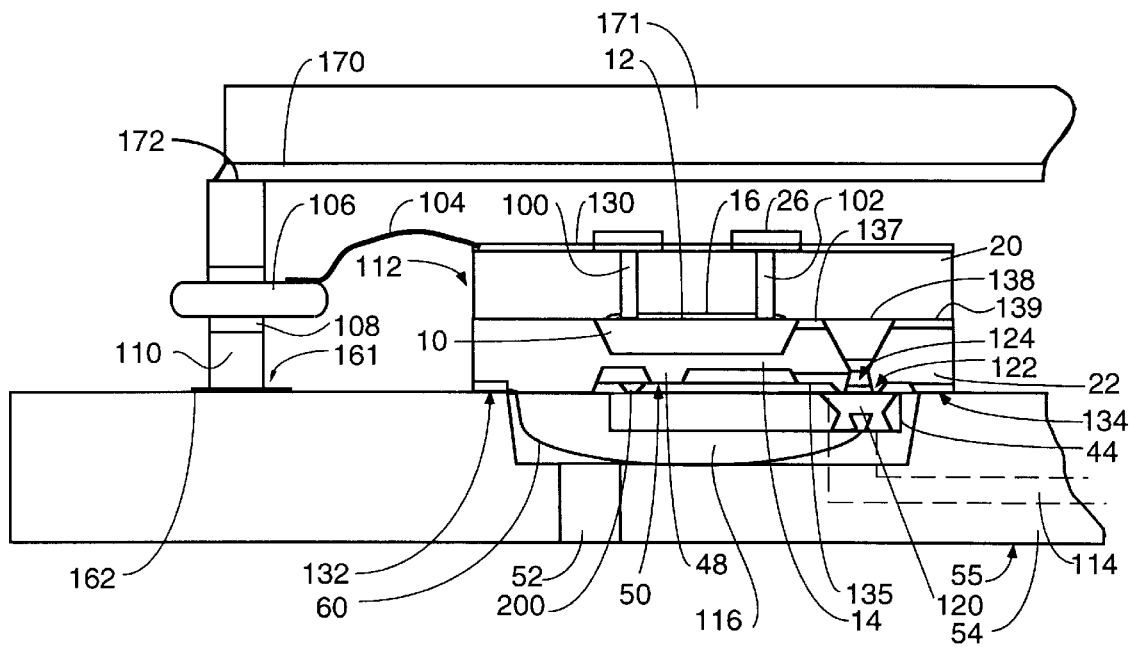
FIG. 4 is cross-sectional view of an alternative embodiment for a low leak valve structure.

For example, the valve of FIG. 1 can be fabricated for use in ultra clean environments by forming containment barrier seals at locations 82, 84, 85, 87, 89 and 91. The term "primary containment structure" used in the claims is intended to cover any structure which defines the boundaries of the wetted area which is exposed to the fluids being controlled by the valve and is not intended to include the secondary containment structure to contain toxic materials from escape into the environment after failure of the primary containment structure. An example of the "primary containment structure" is the chemically compatible seals at 82, 84, 85, 87, 89 and 91 and the walls of the fluid passageways defined by these seals in the valves of FIGS. 1 and 8. In the valve of FIG. 4, the primary containment structure is defined by the fluid passageway walls defined by the chemically compatible seals at 132, 134, 135 and 137 and 139 and another chemically compatible seal (not shown) surrounding the junction between the output port passageway 114 in block 54 and the connecting passageway in die 22. An example of the secondary containment structure is the hermetic seals at 161, 172 and the seal between the glass area 108 and the package wall 110 along with the package wall 110 and the package top structures 170 and 171 in the embodiment of FIG. 4. The function of these seals in the primary containment structure is to prevent the escape of any fluid being controlled in the stream flowing between input port 52 to output port 56 to a point outside the wetted area where the fluid being controlled might be exposed to a material which could pollute the fluid being controlled by adding unwanted materials or ions thereto or which could be corroded, hardened, swollen, altered, degraded or destroyed by the fluid thereby rendering the valve subject to immediate or eventual failure. If an ultra-clean, low-leak valve is to be fabricated, an appropriate temperature bonding process must be used.

The choice of materials in the wetted path for the valve structure shown in FIG. 1 controls the applications for which the valve can be used. The possibilities are: non-low-leak valve; a low-leak valve for non-ultra clean environments; or an ultra clean valve of either the low leak or non low leak variety.

Non low leak valves do not need the compliant valve seat materials disclosed herein and any of the species disclosed herein with compliant valve seats can also be made as non-low leak valves without compliant valve seats.

Most if not all of the valve species within the genus of the invention can be made as ultra clean valves by use of containment seals and selection of materials within the wetted area which are chemically compatible with the ultra clean processing environment such as silicon for the second die 22 and valve element 44 and ceramic or silicon for the base 54. The valve element 44 and the spring 60 may also be made of stainless steel alloys such as stainless steel 316 or 316L or high nickel chrome content alloys such as Hastelloy™ (2.5% cobalt, 3.5–5.5% tungsten, 55–60% nickel, 13–16% chromium, 4–7% iron, 1% manganese, 1% silicon, 17% molybdenum). Other materials which are known to be compatible with ultra clean processing environment which can be readily formed into the components described in the various valve species disclosed herein may also be used for components in the wetted area. The spring may also be made of silicon and is in some of the species disclosed below.

Figure 3A:
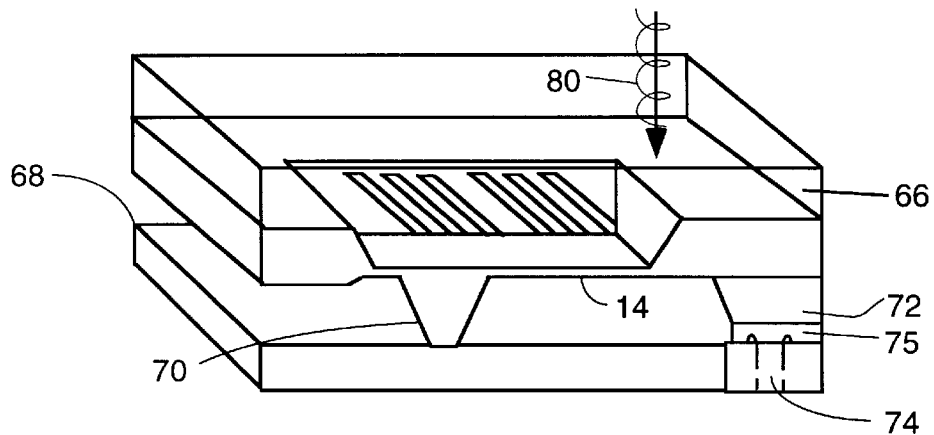
FIG. 3 is comprised of FIGS. 3A, 3B and 3C, with FIG. 3A showing a prior art Fluistor™ NC105 valve modified to include a low leak seal, said valve being shown in the closed position.
FIG. 3B shows the modified valve of FIG. 3A in the open position and FIG. 3C shows a closeup perspective sectional view of the low leak valve seal used in the modified Fluistor™ valve. Note that the wetted area of this valve includes the wire bond and all other sealing materials.
Figure 3B:
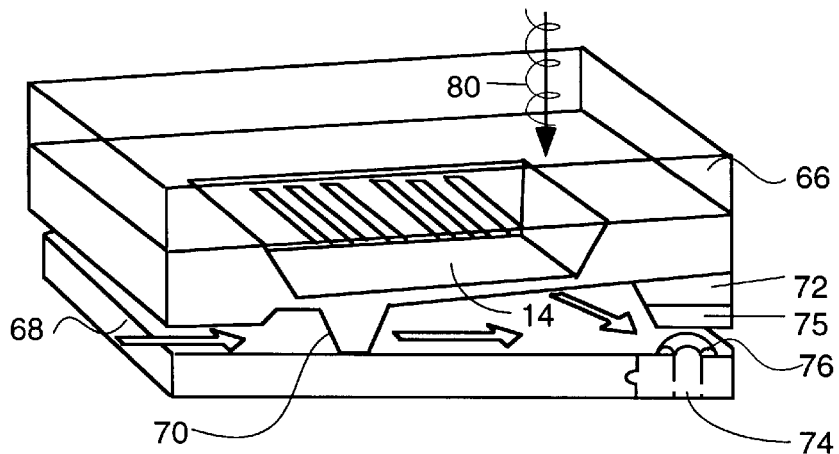
Figure 3C:
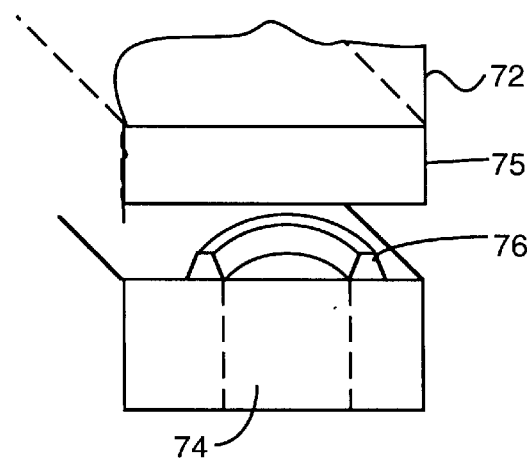

Referring to FIGS. 3A and 3B and 3C, there are shown diagrams of the prior art Fluistor™ valve in open and closed positions, but modified to be a non ultra clean, low leak valve. The Fluistor™ valve is a normally closed valve comprised of an actuator 66 similar to the structure described above, the membrane thereof being mechanically coupled to an unmovable lower portion 68 by a pedestal 70. The pedestal is located away from the center of the membrane 14 such that when the membrane flexes, the angle that the portion of the membrane to which the pedestal 70 is attached changes from the horizontal position shown in FIG. 3A for the closed state to the angle shown in FIG. 3B for the open state. This change in angle causes the actuator 66 to pivot upward about the pedestal 70 thereby lifting a valve seat 72 away from an output port 74 thereby opening the valve. In the prior art Fluistor™ valve, the valve seat was a flat, noncompliant silicon plateau which, when the valve was closed, rested on the flat surface of the immovable lower portion of the valve through which the output port 74 was formed. The modifications to the prior art Fluistor™ valve disclosed and claimed herein are the addition of a compliant valve seat material 75 to the underside of the valve seat plateau 72, the addition of a narrow ridge formed into the silicon or other material of the immovable base or lower portion 68 so as to surround the opening of the output port 74 in the surface of the lower portion 68 facing the valve seat plateau portion 72, and the addition of bias means represented by spring 80. The function of the ridge 76 surrounding the port to be blocked is to dig into the compliant material when the valve is closed to form a positive seal. An enlarged view of the ridge 76 surround output port 74, and its relationship to the compliant valve seat 74 and the valve seat plateau 72 is shown in FIG. 3C. Those skilled in the art will appreciate that any of the compliant valve seat arrangements disclosed herein can be substituted for the particular arrangement shown in FIG. 3C. The function of the bias means is to increase the closing forces to force the compliant material to envelope the ridge to ensure a tighter close. The bias means can be any of the techniques disclosed herein such as a spring, pressure differentials, preloading etc.

Referring to FIG. 4, there is shown an alternative embodiment for a low leak valve structure using hot pressed, compliant valve seat. Elements having like reference numbers to elements in the embodiment of FIG. 1 have identical functions in the combination and similar attributes although variation of attributes such as material, dimensions, bonding materials or process within the teachings of the genus of the invention to accommodate different species such as ultra-clean species etc. are contemplated.

The valve is comprised of an integrated actuator which includes a working fluid 12 trapped in a cavity 10 having a thin wall acting as a flexible membrane 14. The membrane flexes in the negative y direction when the temperature of the working fluid is raised by passing current through a resistor element 16, shown as the cross hatched metallization layer 16 formed on the underside of a Pyrex top die 20. The underside of the pyrex die 20 also has a chromium barrier 138 at the location of the intersection of a port 124 in a middle silicon die 22 and the Pyrex top die 20 if the valve is to be used in an ultra clean environment.

Figure 5:
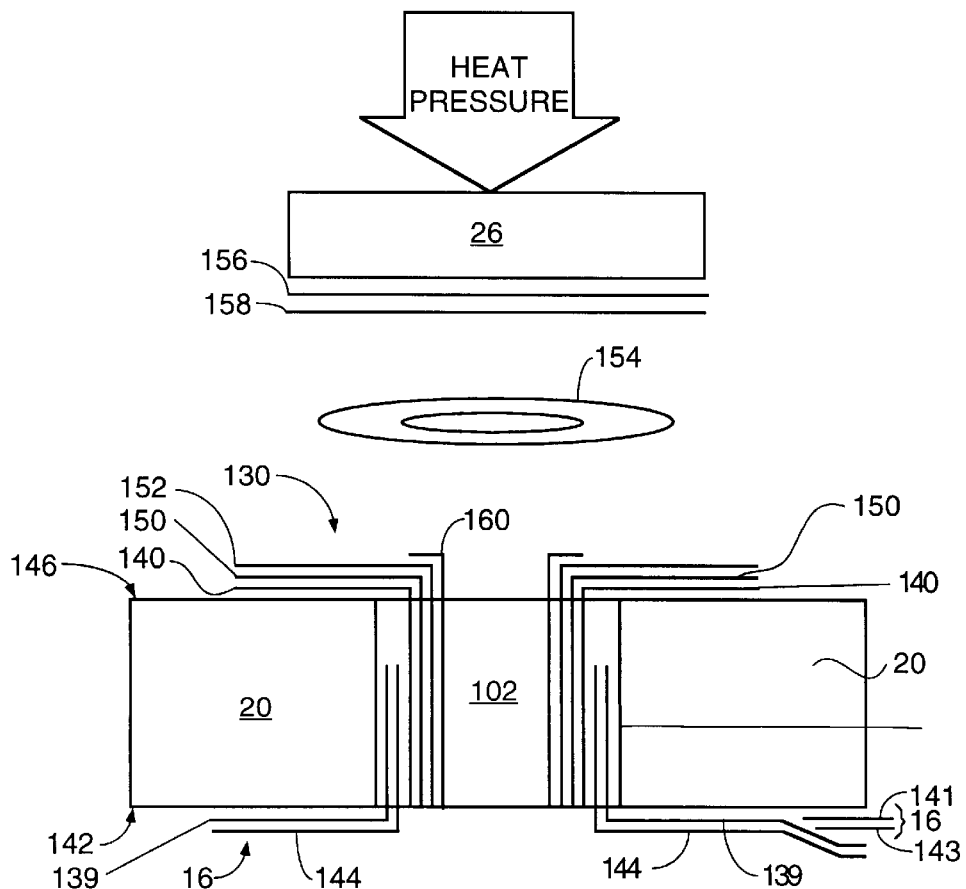
FIG. 5 is diagram illustrating a process for forming the seal for the fill holes in the valve actuator.

The metallization layer on top of the pyrex die 20 is used both for connectivity to the resistor 16 as well as for forming a eutectic bond to the fill hole sealing cap 26. Referring to FIG. 5, there is shown a diagram which explains the process for eutectic bonding of the silicon fill caps 26 over the fill holes 100 and 102. The resistor 16 is shown in FIG. 5 as comprised of a 50 Å titanium layer 141 formed on the underside of top die 20 covered by a 4100 Å layer of platinum 143. These two layers are partially overlapped by a 500 Å chromium or other suitable material such as titanium adhesion layer 139 which is formed on the undersurface 142 of the top die 20 and which extends up into the fill hole 102. This chromium adhesion layer 139 is covered with a 5000 Å thick gold bonding layer 144. The metallization layer 130 on top of the top die 20 makes the electrical connections to the wire bonds that lead to terminals outside the secondary containment barrier/hermetic seal of the package and extend down into the fill holes to electrically connect to the chromium layer 139 and the gold layer 144 thereby making the connections to both ends of the resistor 16. The single top metallization layer 130 depicted in FIG. 5 represents two electrically isolated conductive patterns on the surface 146 of the upper die 20 to make electrical contact with the resistor 16. The metallization layer 130 is typically comprised of a 500 Å thick adhesion layer 140 of chromium covered by a 7500 Å thick separation and conductivity layer 150 of copper. A 5000 Å thick bonding layer 152 of gold is then deposited on top of the layer of copper. The chromium layer provides good adhesion to the pyrex 20 and the top gold layer of the resistor 16. The copper layer 150 acts as a conductivity layer to provide a low resistivity path to the resistor 16. The gold layer 152 is for purposes of effecting the gold-tin seal to the gold-tin preform washer 154 during the heating process to form the bond. A 400 Å thick chromium (or other suitable material) release layer 160 is also provided on top of the gold bonding layer 152 only on the walls of the fill holes 100 and 102 for reasons which will be explained below. The underside of the sealing cap 26 is covered with a 1500 Å thick chromium (or other material) adhesion layer which is covered by a 5000 Å thick gold bonding layer.

The eutectic bond is formed by placing a 25 micron thick gold-tin alloy preform washer 154 between the underside of the silicon fill cap 26 and the top metallization layer 130 surrounding the fill hole. The silicon fill cap is then placed over the fill hole, and a reflow head is then placed cold on the fill cap. A pulse of energy is then supplied to heat the reflow head, the silicon chip 26 and the metallization layers to about 350 degrees centigrade. The gold-tin preform washer then melts and the gold therein forms a gold solder with the melted gold of the facing gold layers on the underside of the silicon chip 26 and the metallization layer 130. Some percentage of the material of the preform washer winds up in the fill holes after it is melted. The chromium release layer 160 prevents the melted preform washer material from bonding to the metallization layer on the inside walls of the fill holes. If the chromium release layer were not present, the contraction of the melted preform material as it cooled may pull the metallization layers on the inside walls of the fill holes free of the glass walls and cause a possible discontinuity in the electrical connections to the resistor.

The base portion has formed therein an inlet port 52 and a chamber 116 large enough to accommodate movements of a movable valve element 44. The base portion also has formed therein an embedded outlet port 114 which is in fluid communication with the inlet port 52 through a valve seat/port structure including compliant material as shown generally at 120 when the valve is open and is cut off from fluid communication when the valve is closed. Note that outlet port 114 could also be formed to open onto the bottom surface 55 of the base 54 so the base surface 55 could be bolted to a gas manifold with the inlet port 52 and outlet port 114 surrounded by O-rings which are pinched between the base 54 and the gas manifold (not shown).

The base portion is preferably 99% plus purity alumina. It is possible to make the base 54 out of stainless steels, silicon or other materials compatible with the processing environment in which the valve will be used. The passageways and chambers in the alumina are formed, in one method, by layering a stack of tapes of "green" ceramic (alumina particles held together with organic binder prior to firing) which are cut with patterns that form the cavities and passageways when the stack is complete. The resulting base is then fired.

The integrated actuator also includes a silicon middle die 22 which forms part of the cavity 10 when the top and middle dies are joined. The middle die is formed to have a thin membrane 14 as one wall of a well forming part of cavity 10. The membrane has a pedestal 48 formed thereon positioned about midway between the center and the edge of membrane 14.

The valve element 44 is permanently bonded at 50 to the pedestal 48. When the membrane flexes, the changing angle at the position of the pedestal 48 imparts movement to the valve element 44 thereby disengaging the flexible material of the valve seat from a narrow ridge or projection 122 of approximately 1–2 mils width at its narrowest point which surrounds a port 124 formed in the middle die 22. This narrow ridge deforms the compliant material such as KEL-F or other similarly compliant materials of the valve seat 120 when the valve is closed to form a tight seal. To assist in achieving low leak rates of equal to or better than $10^{-6}$ cc-Atm/sec Helium, a spring 60 is included to apply force to the valve element in the positive Y direction when the valve is closed to insure a tight seal. This spring must be chemically compatible with the processing environment in which the valve will be used.

The outlet port 114 is shown in dashed lines because it does not lie in the plane of the cross section. The path of the outlet port is in from the side of the base and then upward in the positive Y direction through the base into the middle die 22, then down into the page and back down in the negative Y direction to join with port 124. In an alternative embodiment, the outlet port 114 may pass straight down through the base in the negative Y direction and exit from surface 55.

After forming the base, the spring 60 is placed in the cavity 116, and the combination of the valve element 44 and integrated actuator are bonded to the base aligned in the manner shown in FIG. 4. The primary containment barrier defines the wetted area and is as defined above including the seals at 132/134. In ultra clean species, the seals of the primary containment barrier and materials in the wetted area must be chemically compatible with the fluid being controlled and the environment of the application.

Next, the valve structure is hermetically sealed inside a metal package. The metal package protects the valve structure from damage, and the hermetic seals serve as a secondary containment barrier to prevent escape of possibly toxic gases in the event of failure of the primary containment structure.

The metal frame has a lid 170 that is welded to the frame 110 at 172 by either a seam welding, laser welding or e-beam welding process. Epoxy bonding, solder, other adhesives or an O-ring and mechanical clamping arrangement could also be used to form the secondary containment seal since this seal is outside the wetted area.

Figure 6:
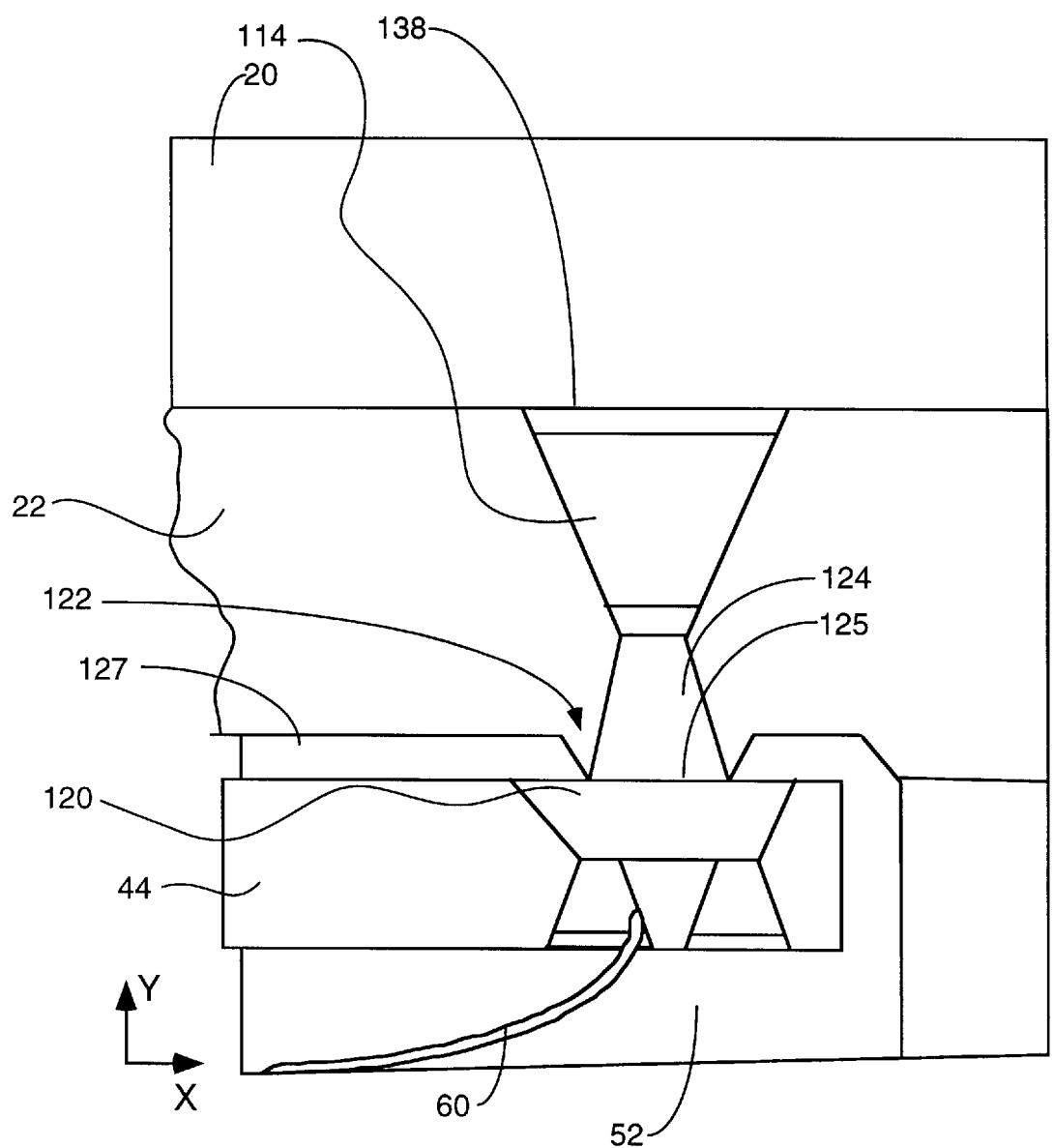
FIG. 6 is a closeup view of the valve seat area.

Referring to FIG. 6, there is shown a closeup view of the compliant valve seat used for the low leak valve of FIG. 4. The low leak valve seat arrangement comprises a port 124 formed by a passageway in the middle silicon die 22. The port is surrounded by a ridge 122 which deforms the compliant material of the KEL-F valve seat 120 when the valve is closed. Optional auxiliary spring 60 provides upward force in the positive Y direction on the valve element to help deform the compliant material to form a tighter seal. As noted above, this bias force may also be provided by other methods detailed above. A transverse flow channel 114 joins port 124 to complete the fluid flow channel. The exposed portion of the Pyrex top die 20 may be covered with a chromium barrier 138

The compliant material 120 can be KALREZ™ material, which, in the case of the ultra clean embodiment of FIG. 1, can be hot formed into a hole formed in the valve element 44. This process involves raising the temperature of uncured KALREZ™ material until it flows and then simultaneously applying pressure to a layer of KALREZ™ material placed over a die having a plurality of valve elements 44 defined therein having holes etched where the valve seat is to be located. The KALREZ™ material then flows into the holes and conforms to the walls thereof. The shape of the hole is like a keyhole with inverted V-shaped walls which are formed by anisotropic etching along crystal axes to form the holes in the valve element from both surfaces toward the middle as is well known in the art. The keyhole shape retains the KALREZ™ material in place without the need for a bonding agent between the materials.

Figure 7:
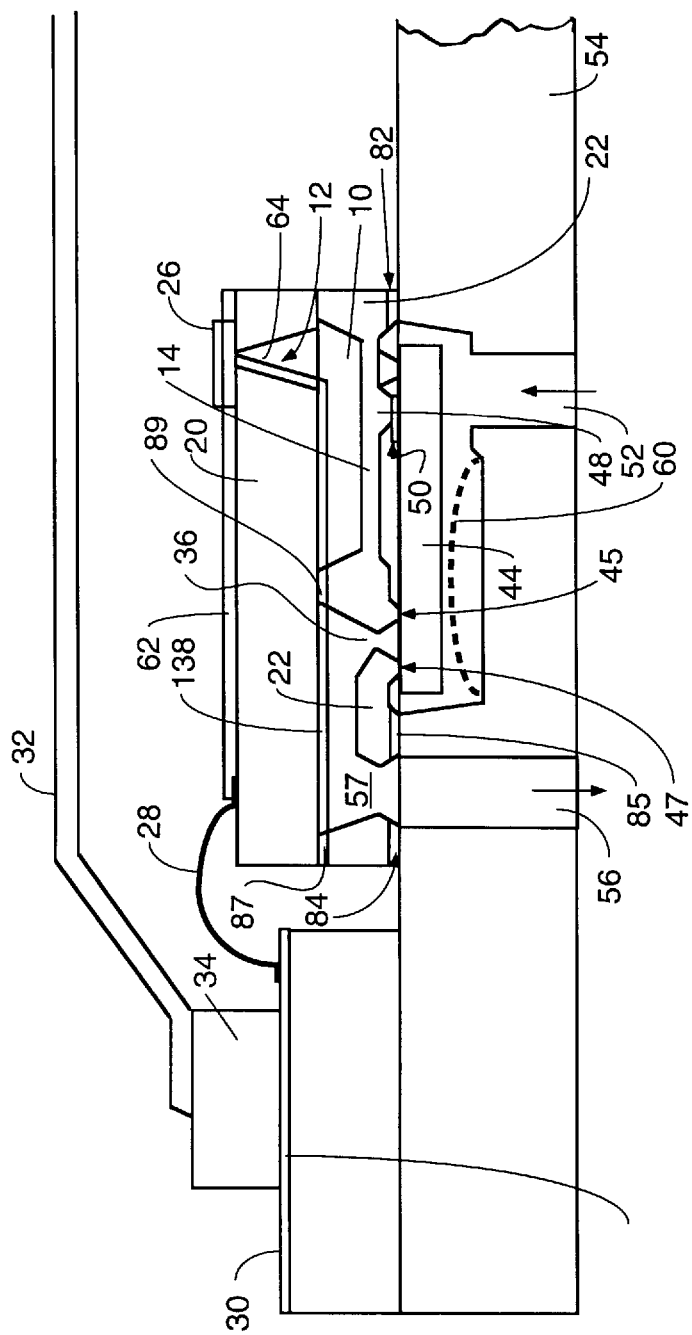
FIG. 7 is a cross-sectional view of a non low leak valve species within the genus of the invention.

Referring to FIG. 7, there is shown a non low leak embodiment using a movable valve element. The only difference between the embodiment of FIG. 7 and the embodiment of FIG. 1 is that the low leak compliant valve seal has been eliminated. All elements having the same reference numbers as elements in FIG. 1 perform the same function in the combination as the like numbered elements in FIG. 1. The particular embodiment shown in FIG. 7 uses a flat seat area surface 45 with a raised ridge 47 around the port 36. In an alternative embodiment, the port 36 could be surrounded by a flat surface, and the seat area 45 could be a mesa shape with a flat upper surface. The valve of FIG. 7 can be made an ultra clean valve by proper choice of materials and construction techniques in accordance with the guidelines given herein.

It is important in low leak valve embodiments and even in non low leak embodiments of a normally closed valve to minimize leakage around the valve seat when the valve is closed. To help minimize leakage, it is important to maintain the surface of the compliant material (or the flat valve seat surface in non low leak embodiments) parallel to and in intimate contact with the plane defined by the surface surrounding the port which is blocked to close the valve. For example, in the low leak valve seat structure shown in FIG. 6, it is important to keep the plane of the surface 125 of the compliant material 120 parallel to and in intimate contact with the plane defined by the tip of the ridge 122 surrounding the port 124.

Figure 8:
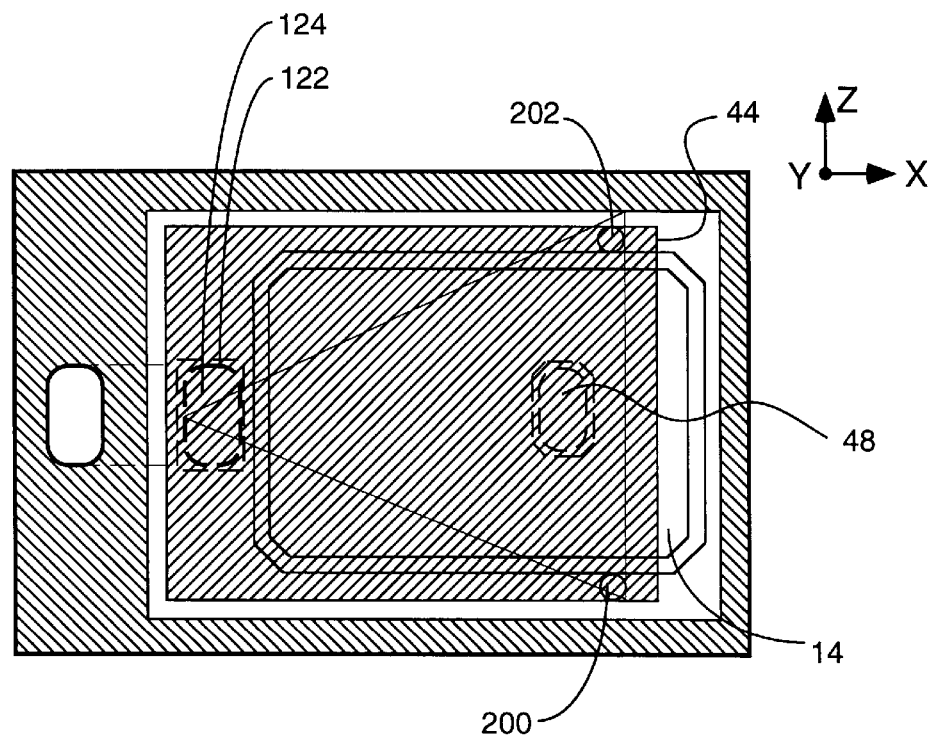
FIG. 8 is a bottom view of a valve according to the genus of the invention showing the three point support to achieve coplanar alignment.

Referring to FIG. 8, there is shown one way of achieving this parallelism. It will be noted that the exhaust port of the embodiment of FIG. 8 is consistent with the embodiment of FIG. 1 and the alternative embodiment of FIG. 4 where the exhaust port is located on the undersurface 55 of the base 54. It is not critical to the invention that this particular manner of achieving parallelism be used. Any method or structure which keeps the plane of the valve seating surface parallel with the plane of the port which is being blocked will suffice for purposes of lowering the leak rate. FIG. 8 is a generic bottom view of the valve structure of any of the valves of FIGS. 1, 4 or 7. The valve element is the square element 44 labelled LOPY. The flexible membrane 14 lies above the LOPY in the positive Y direction (into the page) but is shown in solid lines even though part of the outline is obscured by the valve element 44. The pedestal 48 projecting from the membrane 14 attaches to the valve element and pulls it into contact with two coplanar rests 200 and 202. These rests 200 and 202 are projections from the underside of the membrane 14 which are sized to have the same height on the Y axis as the rim 122 (see FIGS. 6 and 4) that surrounds the port 124. The valve element 44 has its upper surface 125 polished to flatness such that the upper surface 125 of the compliant material is coplanar with the rest of the upper surface 127 of the valve element 44. When this plane is simultaneously in contact with the rests 200 and 202 and the ridge 122 around the port 124, the plane defined by the ridge 122 will be coplanar and in intimate contact with the plane established by the three points defined by the tips of the rests 200 and 202 and the tip of the ridge 122.

Anodic Bonding Process

The following bonding process is given as an example to bond Pyrex to silicon at the junction of die 20 to die 22 or wherever else a Pyrex-silicon bond is needed.

1. Clean the Pyrex with a mixture of $H2SO_4$-$H_2O_2$ at 100° C.
2. Clean silcon with B.O.E. (buffered oxide etchant) to remove all oxidation.
3. Rinse/dry with deionized water/nitrogen.
4. Align the Pyrex and silicon dies properly.
5. Ramp up the temperature to 400° C. and do a 15 minute heat soak.
6. Apply a negative electrode to the top surface of the Pyrex and a positive electrode hot plate to the bottom surface of the silicon and apply a 700 volt D.C. potential difference to the two electrodes for 15 minutes to drive at least a 4 milliamp current through the dies (or wafers in the preferred case).
7. Ramp down the temperature and turn the voltage off.
8. Post bonding anneal: heat soak the bonded structure (before any additional metallization layers are applied) at 500 degrees C. in a nitrogen ambient for approximately 0.5 hours.

Any of these ultra clean valve species may be made as either low leak valves with compliant valve seats disclosed herein which are compatible with the particular valve topology or as non low leak valves where no compliant valve seat material is used. In addition, the "non low leak" valve of FIG. 7 may in fact be a low leak valve when the material being controlled is a liquid, but not a non low leak valve for controlling gases. It will be appreciated by those skilled in the art that all the valve disclosed herein are capable of proportional control from the normally closed position by controlling the temperature of the working fluid to hold the valve open at intermediate stages.

Process Schedule and Masks

Figure 11:
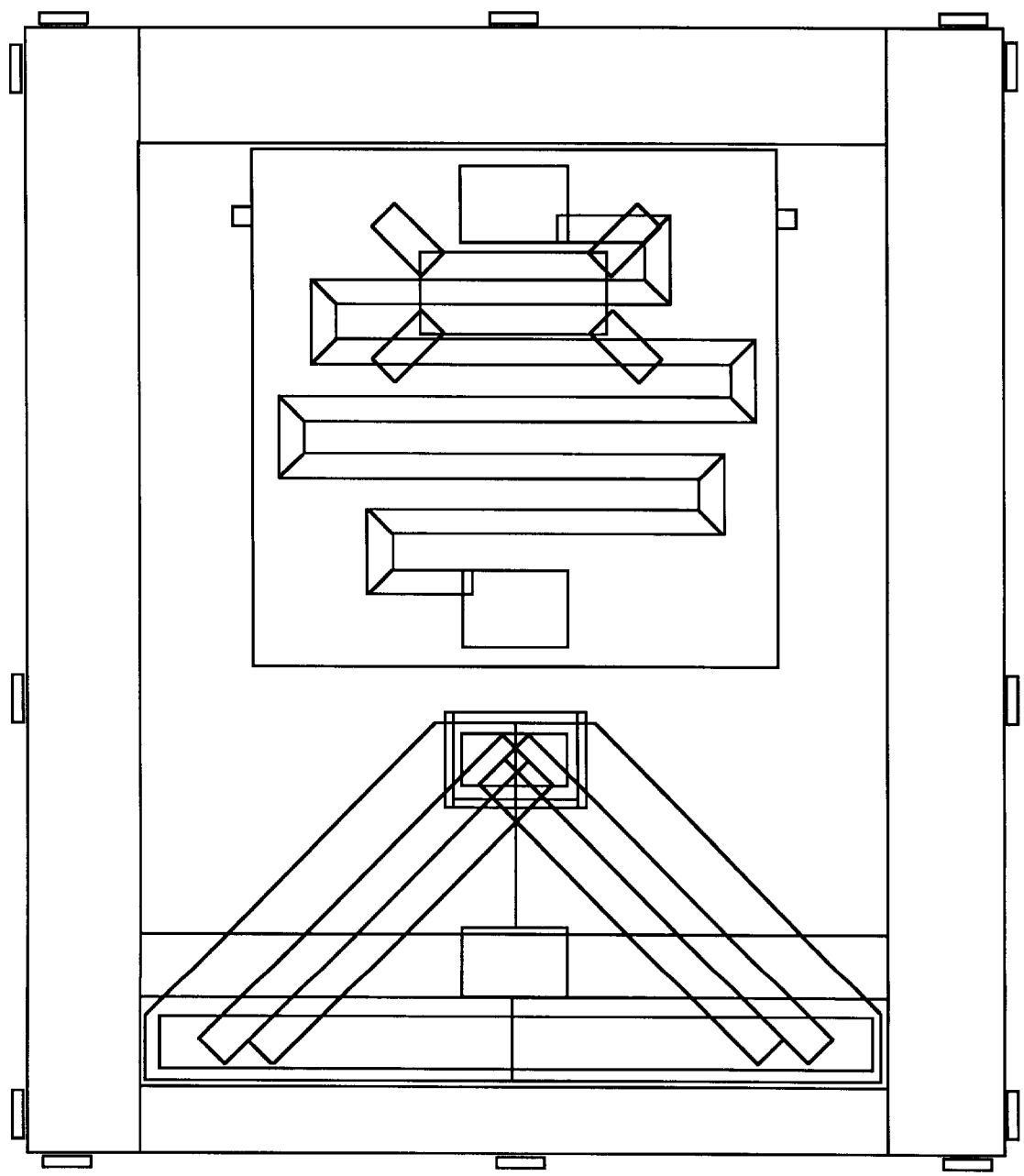
FIG. 11 is a composite mask drawing for the masks needed to build the embodiments of FIGS. 1 and 5.
Figure 13:
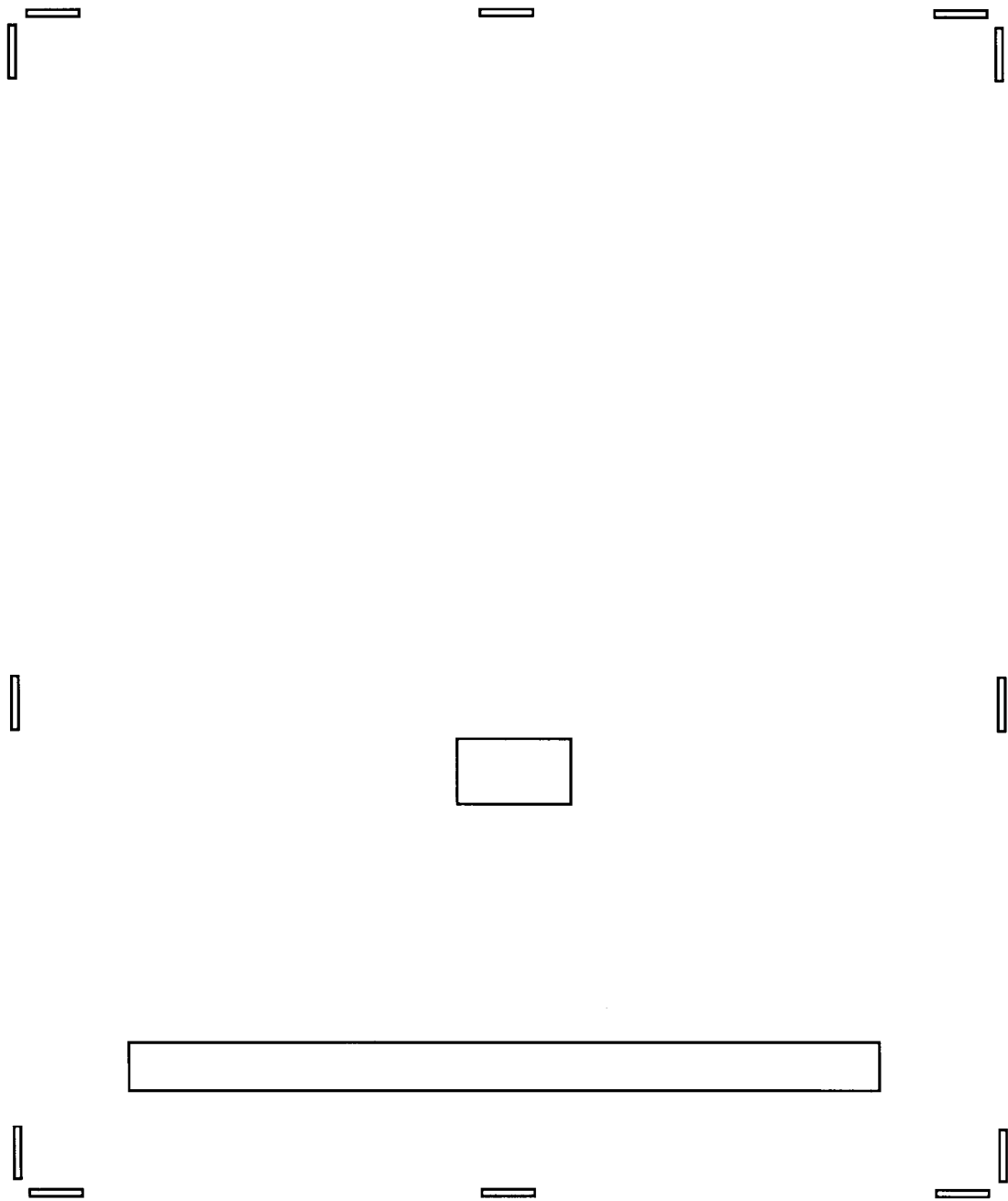
Figure 14:
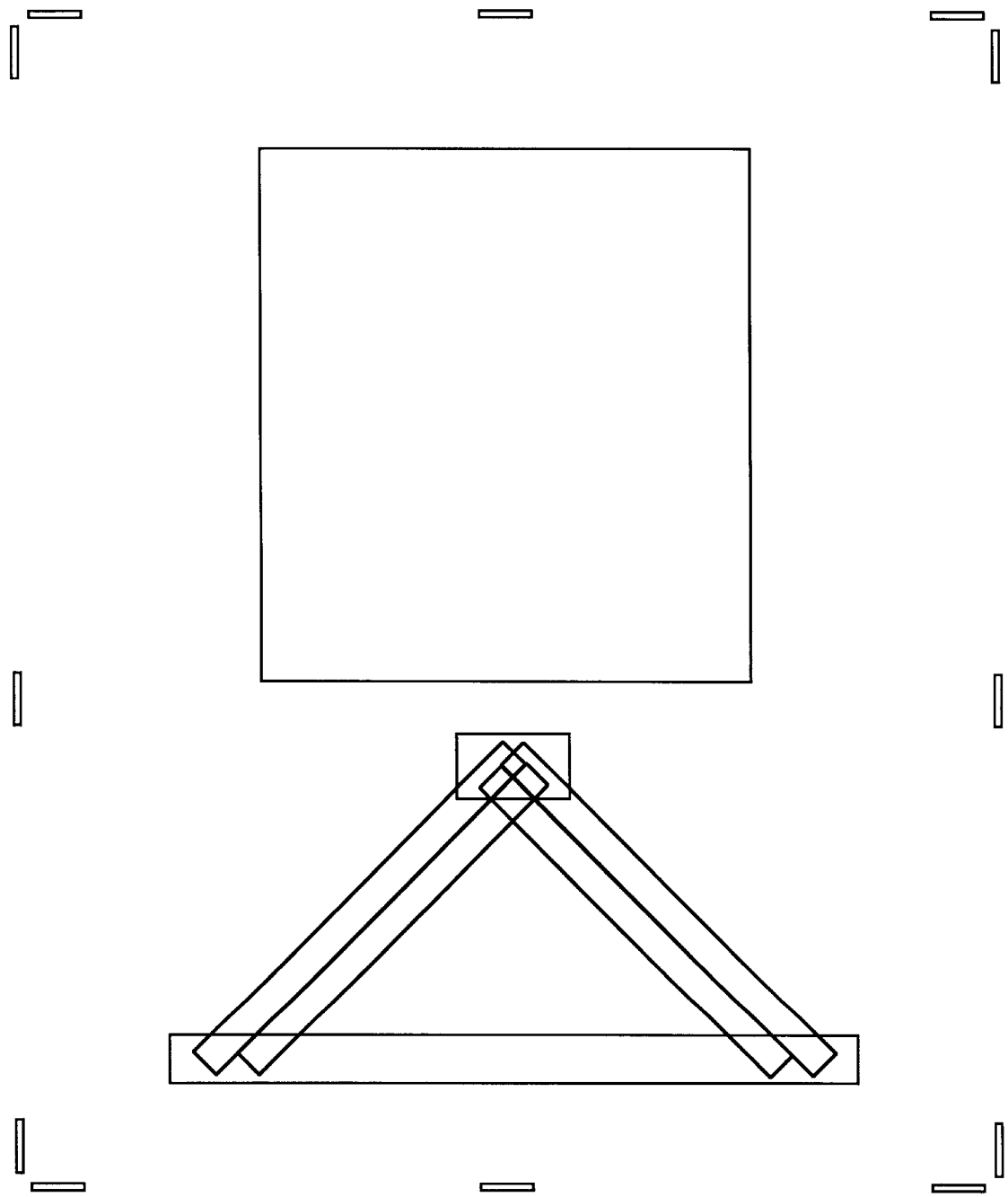
Figure 15:
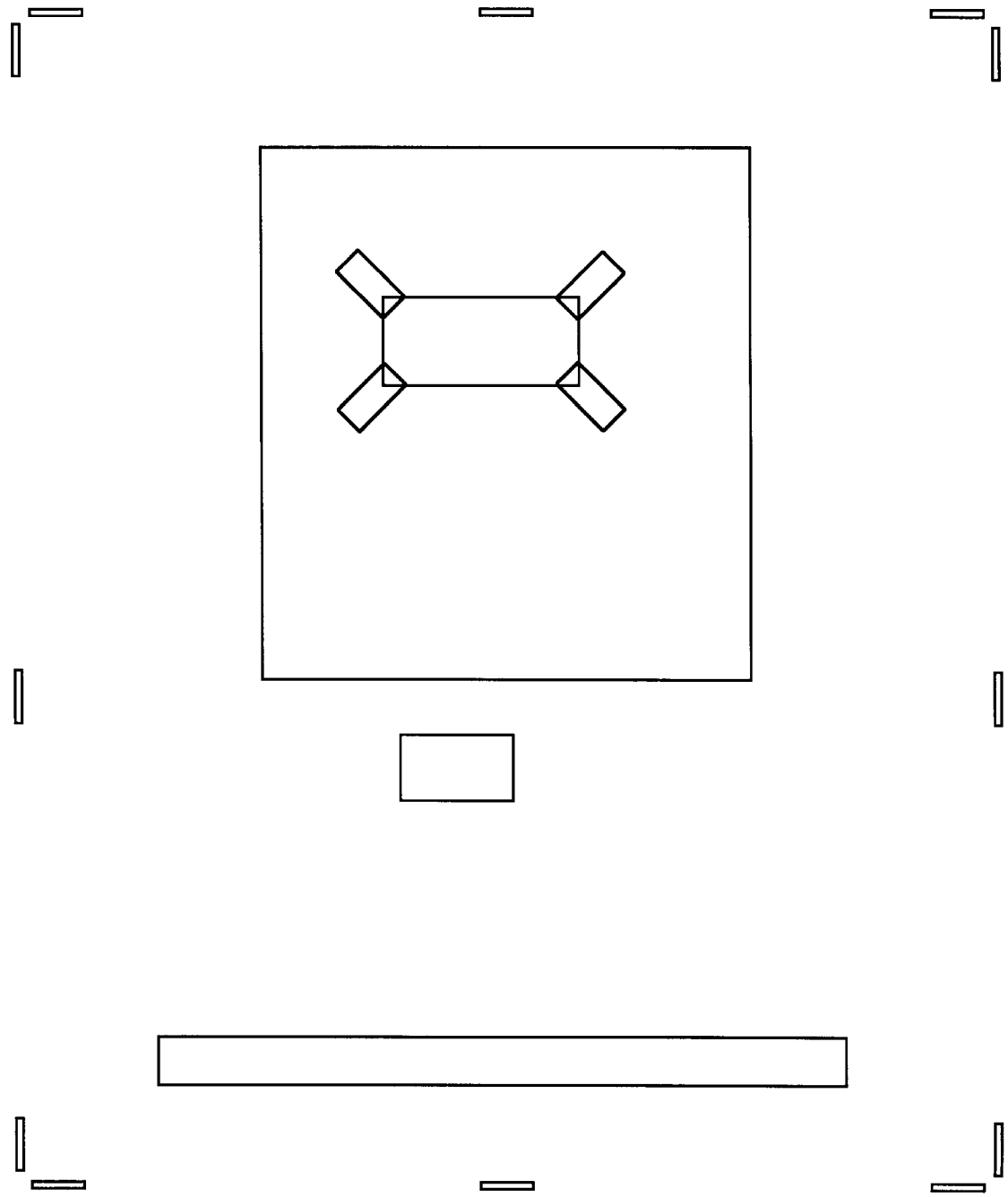
Figure 16:
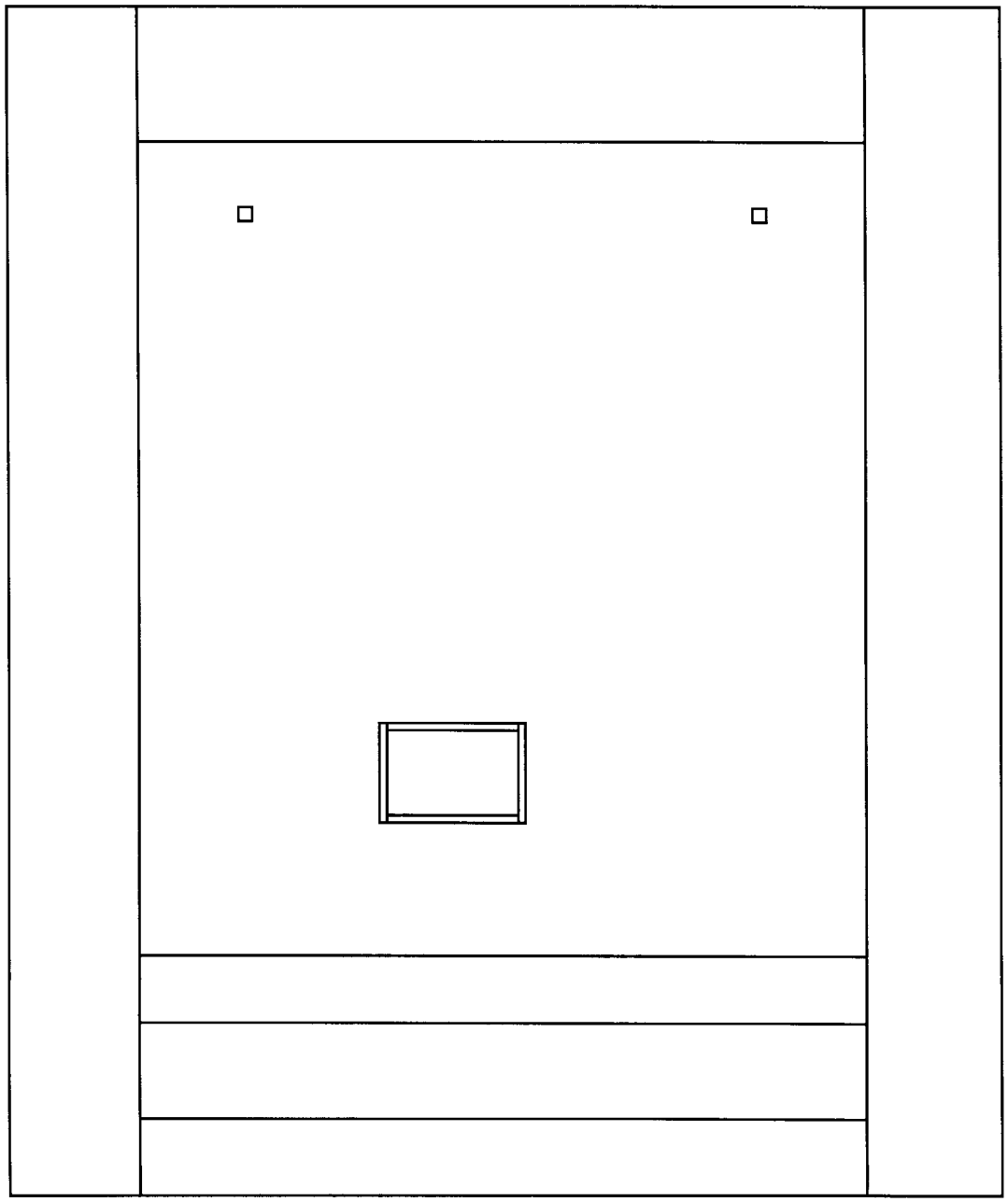

The following process schedules coupled with the composite mask drawing of FIG. 11, and the individual mask drawings of FIGS. 12–16 provide sufficient detail to one skilled in the art of integrated valve fabrication to build at least one species of an integrated valve of the general topology shown in FIG. 1. The terms UPPY and LOPY refer to die 20 and valve element 44, respectively.

Step Operation
Description
1 Obtain Silicon Diaphragm wafer
2 Aqua Regia Strip, Dump rinse 5 cycles.
3 Etch Cr, CR-4, Dump rinse 5 cycles.
4 Strip Oxide from silicon 6:1 BOE, Dump rinse 5 cycles.
5 Add Pyrex UPPY and backing wafers. Rinse and spin dry
6 Water jet scrub Pyrex on Solitec
7 Anodic Bond 400° C., 700V, 15 min. Use silicon strips to spread the voltage across the surface.
8 Measure and record curvature: μm units
9 Dump rinse 5 cycles, spin dry
10 Scrub both sides with wet towel. Do not use soap.
11 Dump rinse 5 cycles, spin dry
12 Anneal 500° C., 30 min, nitrogen
13 Measure and record curvature: μm units
14 Post anneal inspection
15 Top metal 1 TM1, CrCuAu, "Z" pattern shadow mask
16 Top metal 2 TM2, Cr, UPPY shadow mask
17 Map resistors, ink rejects
18 Visual inspect, ink rejects
19 Tape mount to 2 layers of blue Nitto tape, Dice
20 Wipe with wet soapy towel. rinse, blow dry
21 Demount and waffle pack good die
22 Final Visual inspect
NC408 Bonded Actuator
Uppy: 43-1019-01, UP105-TC
9/6/96 DH
Diaphragm: NC408 Silicon
Step Operation
Description
1 Obtain Silicon Diaphragm wafer
2 Aqua Regia Strip, Dump rinse 5 cycles.
3 Etch Cr, CR-4, Dump rinse 5 cycles.
4 Strip Oxide from silicon 6:1 BOE, Dump rinse 5 cycles.
5 Add Pyrex UPPY and backing wafers. Rinse and spin dry
6 Water jet scrub Pyrex on Solitec
7 Anodic Bond 400° C., 700V, 15 min. Use silicon strips to spread the voltage across the surface.
8 Measure and record curvature: μm units
9 Dump rinse 5 cycles, spin dry
10 Scrub both sides with wet towel. Do not use soap.
11 Dump rinse 5 cycles, spin dry
12 Anneal 500° C., 30 min, nitrogen
13 Measure and record curvature: μm units
14 Post anneal inspection
15 Top metal 1 TM1, CrCuAu, "Z" pattern shadow mask
16 Top metal 2 TM2, Cr, UPPY shadow mask
17 Map resistors, ink rejects
18 Visual inspect, ink rejects
19 Tape mount to 2 layers of blue Nitto tape, Dice
20 Wipe with wet soapy towel. rinse, blow dry
Assembly Flow
1. Part inspection
2. LOPY clean
3. LOPY attach/cure
4. First seal
5. Fill and seal FC34 or as required at 65 degrees Centigrade
6. Isobaric test-200 psi for 1 minute
7. Visual inspection
8. Temperature cycle between −20 to 150 degrees Centigrade
9. Bake 48 hours
10. Visual inspection
11. Isobaric test at 200 psi for 1 minute
12. Final Quality Assurance inspection Any of the valves disclosed herein as well as any integrated normally open valves can be made more corrosive resistant by coating the materials in the wetted area with a layer deposited by conventional vapor deposition processes. Specifically, the surfaces of middle die 22 exposed to the wetted area can be coated with materials such as $Si_3N_4$ or $SiO_2$ or SiC or diamond-like carbon film. It is only necessary to coat the exposed silicon on the underside of the middle die 22.

Figure 17:
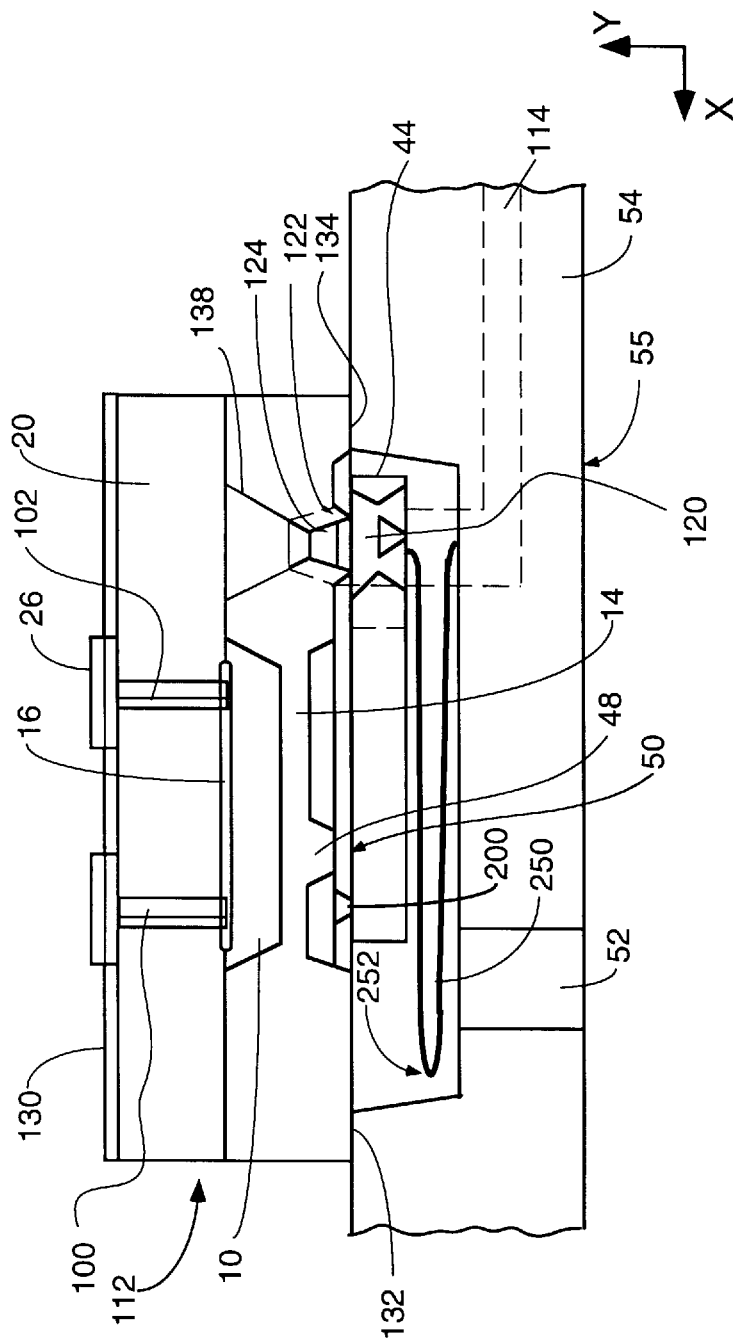
FIG. 17 is a cross sectional view of an alternative embodiment of a normally closed valve with a folded spring to achieve a lower spring rate.

FIG. 17 is a cross-sectional view of an alternative embodiment for a low leak valve of the general structure shown in FIG. 4. Structures having like reference numbers as structures in FIG. 4 are the same material and serve the same purpose as in the embodiment of FIG. 4, and the description thereof will not be repeated here. The difference between the embodiment of FIG. 17 and the embodiment of FIG. 4 is that the auxiliary spring has a folded configuration to give it longer length so as to provide a lower spring rate. Because the flexible membrane 14 can act as a spring, as the membrane flexes outward, it also tends to resist its own outward movement with increasing force at increasing displacement from the fully closed position.

In the ideal normally-closed, low-leak valve, bias force is only needed in the fully closed postion to create a tight seal, and, as the valve is opened, the bias force would decrease or disappear altogether. This would give low leak rates in the closed position, but faster opening times and larger fully open cross-sectional area through which the fluid being controlled flows. Therefore, the ideal means of applying the bias force in the positive Y direction is with a device which applies force when the valve is closed, but not when the valve opens. Any device which has this characteristic will suffice as the bias means as that term is used in the appended claims and is symbolized by spring 250 as the various forms that this bias means may take now and in the future are too numerous to depict in individual drawings. The physical form of the bias means is not important, but the ideal device will be characterized by the force generation behavior described above for the ideal case.

After the ideal case, the next best embodiment for the bias means is a device which applies force when the valve is closed, and still applies force after the valve is open but applies less force tending to close the valve with increasing displacement of the valve element 44 away from the valve seat 122. One possibility for this alternative bias means is a negative rate spring which applies whatever amount of force is necessary to maintain the desired leak rate when the valve is closed, and applies less force with increasing displacement as the valve is opened. An example of such a negative rate spring would be one of the Belville Washers which lies in the negative rate portion of the family of Belville Washers. Another possibility for a bias means in the form of a negative rate spring would be a bistable valve element design or a bistable spring arrangement acting on the valve element. In a bistable valve element design, the valve element is preloaded by its mounting arrangement to have stresses that tend, in a first, stable "valve-closed" position, to apply sufficient force to maintain a tight seal when the valve is closed. However, when the valve element 44 moves toward the open position under the influence of the expanding membrane 14, the valve element moves a small distance and then "snaps" to a second, "valve-open" bistable position wherein no force is applied to the valve element. Another example of a bistable bias means would be for the valve element 44 to have the structure shown in FIG. 17, but have spring 250 itself be a bistable, negative rate design. The design of such a bistable spring arrangement can take many forms apparent to those skilled in the art, and any configuration which can apply sufficient force to achieve the desired leak rate when the valve is closed but which applies lower force with increasing displacement of the valve element away from the valve seat 122 will suffice to practice this species of the invention.

FIG. 17 depicts the second best alternative to the ideal bias means case described above. In the embodiment of FIG. 17, a very long spring 250 is used for the bias means so as to achieve a lower spring rate, i.e., bias force versus displacement of the valve element away from the valve seat 122. In this embodiment, the lower spring rate means that although the force acting of the valve member 44 tending to close it increases with increasing displacement of valve element 44 away from the valve seat 122, the amount of force increase per unit displacement is smaller than in the case of the shorter spring shown in the embodiments of FIGS. 1 and 4.

The spring 250 actually has triangular shape in plan view looking down the Y axis with the tip of the triangle at the compliant valve seat 120 and the wide base of the triangle located at the folded end 252. The spreads out the stresses which would otherwise concentrate at the folded end 252 along the fold parallel to the Z axis. This evens out the stresses so that the material of the spring is subject to a more distributed stress load and is less prone to failure.

Although the genus of the invention has been illustrated in terms of the preferred and alternative embodiments disclosed herein, those skilled in the art will appreciate other embodiments or modifications to the disclosed embodiments that do not depart from the spirit and scope of the teachings of the invention. All such alternative embodiments and modifications are intended to be deemed equivalent to the embodiments disclosed herein and included within the scope of the claims appended hereto.

What is claimed is:

1. An integrated valve comprising:
   an integrated actuator having a flexible membrane which moves in response to energy inputs;
   a valve element that moves in response to movements of said flexible membrane so as to open and close said valve;
   a mechanical linkage between said valve element and said flexible membrane;
   a fluid guiding structure having inlet and outlet ports and a valve seat, said inlet port being in fluid communication with said outlet port through said valve seat, said valve seat positioned so as to be brought into contact with said valve element such that movement of said valve element to a closed position cuts off fluid communication between said inlet port and said outlet port and movement of said valve element to an open position when energy is input so as to cause said flexible membrane to move thereby opening fluid communication between said inlet port and said outlet port.

2. An integrated valve according to claim 1 wherein said integrated actuator comprises:
   a structure integrated into one or more dies comprising a sealed cavity having at least one wall acting as a membrane which is thin enough to be flexible, said sealed cavity having material trapped therein which when heated expands sufficiently to deflect said membrane, and having means for heating said trapped material.

3. An integrated valve according to claim 1 further comprising:
   compliant material interposed between said valve seat and said valve element to aid in forming a tight seal.

4. The integrated valve according to claim 1 further comprising bias means for applying force to said valve element.

5. The integrated valve according to claim 3 further comprising bias means for applying force to said valve element.

6. An integrated valve according to claim 1 further comprising:
   a containment structure surrounding a fluid flow path in which fluid flows from said inlet port to said outlet port to define a wetted area beyond which the fluid being controlled by said valve cannot escape; and
   wherein all structural materials and bonding agents exposed in said wetted area are chemically compatible with the fluids, gases and conditions to which the structural materials and bonding agents may be exposed during use of the valve in ultra clean processing equipment.

7. An integrated valve according to claim 3 further comprising:
   a primary containment structure surrounding a fluid flow path in which fluid flows from said inlet port to said outlet port to define a wetted area beyond which the fluid or gas being controlled by said valve cannot escape and be exposed to materials or bonding agents which are not chemically compatible with the fluids or gases being controlled or other conditions in the wetted area; and
   wherein all structural materials and bonding agents exposed to the fluids being controlled in said wetted area are chemically compatible with the fluids, gases and conditions in the wetted area to which the structural materials and bonding agents may be exposed during use of the valve.

8. An integrated valve according to claim 5 further comprising:
   a primary containment structure surrounding a fluid flow path in which fluid flows from said inlet port to said outlet port to define a wetted area beyond which the fluid or gas being controlled by said valve cannot escape and be exposed to materials or bonding agents which are not chemically compatible with the fluids or gases being controlled or other conditions in the wetted area; and
   wherein all structural materials and bonding agents exposed to the fluids being controlled in said wetted area are chemically compatible with the fluids, gases and conditions in the wetted area to which the structural materials and bonding agents may be exposed during use of the valve.

9. An integrated valve comprising:
   a fluid guiding structure;
   an integrated actuator having a flexible membrane which moves in response to energy inputs, said flexible membrane anchored by a pedestal to said fluid guiding structure, said pedestal located away from the center of said flexible membrane such that when said flexible membrane expands, said integrated actuator moves relative to said fluid guiding structure, and wherein said integrated actuator has a valve seating surface having thereon a compliant valve seat means for providing a valve seating surface which is softer and more compliant than the material of said integrated actuator;

and wherein said fluid guiding structure has inlet and outlet ports and a port surrounded by a valve seat engaging surface, said inlet port being in fluid communication with said outlet port through said port surrounded by said valve seat engaging surface, said port surrounded by said valve seat engaging surface being positioned on a surface of said fluid guiding structure so as to be brought into contact with said compliant valve seat means in the closed postion of said actuator such that movement of said actuator between closed and open postions causes said compliant valve seat means to move between closed and open positions, respectively, said closed position cutting off fluid communication between said inlet port and said outlet port by engagement of said valve seat engaging surface with said compliant valve seat means, said open position allowing fluid communication between said inlet port and said outlet port by disengaging said valve seat engaging surface from said compliant valve seat means.

10. An integrated valve comprising:

an integrated actuator having a flexible membrane which moves in response to energy inputs;

a valve element that moves in response to movements of said flexible membrane so as to open and close said valve;

a mechanical linkage between said valve element and said flexible membrane;

a fluid guiding structure having inlet and outlet ports and a valve seat, said inlet port being in fluid communication with said outlet port through said valve seat, said valve seat positioned so as to be brought into contact with said valve element such that movement of said valve element to a closed position cuts off fluid communication between said inlet port and said outlet port and movement of said valve element to an open position when energy is input so as to cause said flexible membrane to move thereby opening fluid communication between said inlet port and said outlet port; and biasing means for applying force to said valve element in at least the closed position to decrease the rate of leakage between said inlet port and said outlet port when the valve is closed.

11. An integrated valve comprising:

an integrated actuator having a flexible membrane which moves in response to energy inputs, said integrated actuator having a fluid passageway formed therein, said fluid passageway surrounded by a ridge to form a valve seat;

a valve element that moves between open and closed positions in response to movements of said flexible membrane, said valve element having a compliant material forming at least a portion of a surface of said valve element, said closed position corresponding to a position of said valve element such that said compliant material on a surface of said valve element is deformed by said ridge surrounding said valve seat;

a mechanical linkage between said valve element and said flexible membrane;

a fluid guiding structure having inlet port and an outlet port coupled to said fluid passageway in said integrated actuator and having a fluid passageway coupling said inlet port to said valve seat and fluid passageway in said integrated actuator, said inlet port being in fluid communication with said outlet port through said valve seat and said fluid passageway in said integrated actuator such that movement of said valve element to said closed position cuts off fluid communication between said inlet port and said outlet port and movement of said valve element to said open position opens said valve when energy is input so as to cause said flexible membrane to move thereby opening fluid communication between said inlet port and said outlet port; and biasing means for applying force to said valve element in at least the closed position so as to decrease the rate of leakage between said inlet port and said outlet port when the valve element is in said closed position, said force causing said deformation of said compliant material when said valve element is in said closed position.

12. The valve of claim 11 wherein said biasing means is a spring having a length and material selected so as to cause said spring to have a low spring rate such that the amount of force generated by said spring and acting on said valve element in the open position is not significantly greater than the amount of force acting on said valve element caused by said spring in said closed position.

13. The valve of claim 11 wherein said biasing means is a negative rate spring having a spring rate selected such that the amount of force generated by said spring and acting on said valve element in the closed position is an amount necessary to achieve the desired leak rate and wherein the amount of force applied to said valve element as the valve element moves toward said open position either decreases with increasing displacement of said valve element toward said open position from said closed position or increases slightly and then decreases.

\* \* \* \* \*